(12) United States Patent
Reading et al.

(10) Patent No.: US 10,438,225 B1
(45) Date of Patent: Oct. 8, 2019

(54) GAME-BASED AUTOMATED AGENT DETECTION

(71) Applicant: Amazon Technologies, Inc., Reno, NV (US)

(72) Inventors: William Frank Reading, Seattle, WA (US); Rohit Patnaik, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 698 days.

(21) Appl. No.: 14/133,568

(22) Filed: Dec. 18, 2013

(51) Int. Cl.
*G06Q 30/00* (2012.01)
*G06Q 30/02* (2012.01)

(52) U.S. Cl.
CPC ................... *G06Q 30/0225* (2013.01)

(58) Field of Classification Search
CPC .................................. G06Q 30/0225
USPC ....................................... 705/14.26
See application file for complete search history.

(56) References Cited

U.S. PATENT DOCUMENTS

| | | | |
|---|---|---|---|
| 5,016,170 A | 5/1991 | Pollalis et al. | |
| 5,455,875 A | 10/1995 | Chevion et al. | |
| 5,465,308 A | 11/1995 | Hutcheson et al. | |
| 5,805,745 A | 9/1998 | Graf | |
| 5,826,244 A | 10/1998 | Huberman | |
| 5,848,393 A | 12/1998 | Goodridge et al. | |
| 5,862,223 A | 1/1999 | Walker et al. | |
| 5,884,270 A | 3/1999 | Walker et al. | |
| 5,937,388 A | 8/1999 | Davis et al. | |
| 5,948,054 A | 9/1999 | Nielsen | |
| 5,960,404 A | 9/1999 | Chaar et al. | |
| 5,978,768 A | 11/1999 | McGovern et al. | |
| 6,006,191 A | 12/1999 | DiRienzo | |
| 6,012,066 A | 1/2000 | Discount et al. | |
| 6,032,151 A | 2/2000 | Arnold et al. | |
| 6,041,306 A | 3/2000 | Du et al. | |
| 6,044,355 A | 3/2000 | Crockett et al. | |

(Continued)

FOREIGN PATENT DOCUMENTS

EP 1306788 A1 * 5/2003 ............ G06Q 30/08
WO 0057326 A1 9/2000

(Continued)

OTHER PUBLICATIONS

Microsoft Computer Dictionary, Fifth Edition, 2002, Microsoft Press, p. 23.*

(Continued)

*Primary Examiner* — Matthew T Sittner
*Assistant Examiner* — Michael I Ezewoko
(74) *Attorney, Agent, or Firm* — Davis Wright Tremaine LLP

(57) ABSTRACT

Online retailers may operate one or more services configured to detect requests generated by automated agents. A CAPTCHA may be transmitted in response to requests generated by automated agents. The CAPTCHAs may include queries requesting market data corresponding to items offered for sale on an electronic commerce website operated by the online retailer. The response to the queries may be stored by one or more services of the online retailer and used as market data for the electronic commerce website. The market data may be used to notify customers about one or more items offered for sale on the electronic commerce website.

22 Claims, 12 Drawing Sheets

(56) References Cited

U.S. PATENT DOCUMENTS

| | | | |
|---|---|---|---|
| 6,078,916 A | 6/2000 | Culliss | |
| 6,112,243 A | 8/2000 | Downs et al. | |
| 6,128,380 A | 10/2000 | Shaffer et al. | |
| 6,163,607 A | 12/2000 | Bogart et al. | |
| 6,173,053 B1 | 1/2001 | Bogart et al. | |
| 6,181,343 B1 | 1/2001 | Lyons | |
| 6,182,068 B1 | 1/2001 | Culliss | |
| 6,205,466 B1 | 3/2001 | Karp et al. | |
| 6,223,165 B1 | 4/2001 | Lauffer | |
| 6,272,467 B1 | 8/2001 | Durand et al. | |
| 6,289,340 B1 | 9/2001 | Puram et al. | |
| 6,349,327 B1 | 2/2002 | Tang et al. | |
| 6,393,497 B1 | 5/2002 | Arnold et al. | |
| 6,434,549 B1 | 8/2002 | Linetsky et al. | |
| 6,457,005 B1 | 9/2002 | Torrey | |
| 6,463,426 B1 | 10/2002 | Lipson et al. | |
| 6,513,013 B1 | 1/2003 | Stephanou | |
| 6,539,377 B1 | 3/2003 | Culliss | |
| 6,546,087 B2 | 4/2003 | Shaffer et al. | |
| 6,584,192 B1 | 6/2003 | Agusta | |
| 6,584,464 B1 | 6/2003 | Warthen | |
| 6,587,556 B1 | 7/2003 | Judkins et al. | |
| 6,603,854 B1 | 8/2003 | Judkins et al. | |
| 6,636,590 B1 | 10/2003 | Jacob et al. | |
| 6,662,194 B1 | 12/2003 | Joao | |
| 6,678,714 B1 | 1/2004 | Olapurath et al. | |
| 6,704,403 B2 | 3/2004 | Lurie et al. | |
| 6,707,904 B1 | 3/2004 | Judkins et al. | |
| 6,763,104 B1 | 7/2004 | Judkins et al. | |
| 6,859,523 B1 | 2/2005 | Jilk et al. | |
| 6,938,048 B1 | 8/2005 | Jilk et al. | |
| 7,016,853 B1 | 3/2006 | Pereless et al. | |
| 7,155,157 B2 | 12/2006 | Kaplan | |
| 7,155,400 B1 | 12/2006 | Jilk et al. | |
| 7,167,855 B1 | 1/2007 | Koenig | |
| 7,243,352 B2 | 7/2007 | Mandava et al. | |
| 7,289,619 B2 | 10/2007 | Vivadelli et al. | |
| 7,343,316 B2 | 3/2008 | Goto et al. | |
| 7,415,425 B1 | 8/2008 | Walker et al. | |
| 7,444,323 B2 | 10/2008 | Martinez et al. | |
| 7,472,071 B2 | 12/2008 | Marks et al. | |
| 7,499,903 B2 | 3/2009 | Nevin et al. | |
| 7,523,045 B1 | 4/2009 | Walker et al. | |
| 7,596,578 B1 | 9/2009 | Marks | |
| 7,891,005 B1 | 2/2011 | Baluja et al. | |
| 7,945,469 B2 | 5/2011 | Cohen et al. | |
| 8,245,277 B2 | 8/2012 | Lazar et al. | |
| 8,285,602 B1 | 10/2012 | Yi et al. | |
| 8,290,818 B1 | 10/2012 | Levitan et al. | |
| 8,342,928 B1* | 1/2013 | Teller | 463/42 |
| 8,346,217 B2* | 1/2013 | Crawford | H04W 12/06 455/410 |
| 8,352,598 B2 | 1/2013 | Nyang et al. | |
| 8,499,244 B2 | 7/2013 | Simon et al. | |
| 8,510,795 B1 | 8/2013 | Gargi | |
| 8,516,606 B2 | 8/2013 | Dorfman | |
| 8,522,010 B2* | 8/2013 | Ozzie | G06F 21/43 713/155 |
| 8,646,060 B1 | 2/2014 | Ben Ayed | |
| 8,694,348 B2* | 4/2014 | McGuire | G06Q 30/0239 705/7.11 |
| 8,793,760 B2* | 7/2014 | Raper | G06Q 20/4014 726/3 |
| 8,914,878 B2* | 12/2014 | Burns | H04L 63/1441 726/13 |
| 8,955,076 B1 | 2/2015 | Faibish et al. | |
| 8,997,240 B1 | 3/2015 | Kohen et al. | |
| 9,105,034 B2* | 8/2015 | Hamilton, II | G06Q 30/02 |
| 9,202,105 B1 | 12/2015 | Wang et al. | |
| 2001/0034630 A1 | 10/2001 | Mayer et al. | |
| 2001/0034734 A1 | 10/2001 | Whitley et al. | |
| 2001/0039014 A1 | 11/2001 | Bass et al. | |
| 2001/0049674 A1 | 12/2001 | Talib et al. | |
| 2002/0007301 A1 | 1/2002 | Reuning | |
| 2002/0026452 A1 | 2/2002 | Baumgarten et al. | |
| 2002/0046199 A1 | 4/2002 | Scarborough et al. | |
| 2002/0069079 A1 | 6/2002 | Vega | |
| 2002/0083079 A1 | 6/2002 | Meier et al. | |
| 2002/0128894 A1 | 9/2002 | Farenden | |
| 2002/0133369 A1 | 9/2002 | Johnson | |
| 2002/0198765 A1 | 12/2002 | Magrino et al. | |
| 2002/0198766 A1 | 12/2002 | Magrino et al. | |
| 2003/0046207 A1 | 3/2003 | Torre et al. | |
| 2003/0078852 A1 | 4/2003 | Shoen et al. | |
| 2003/0195789 A1 | 10/2003 | Yen | |
| 2003/0200156 A1 | 10/2003 | Roseman et al. | |
| 2003/0204449 A1 | 10/2003 | Kotas et al. | |
| 2003/0208393 A1 | 11/2003 | Younger | |
| 2004/0015388 A1 | 1/2004 | Royall et al. | |
| 2004/0024296 A1 | 2/2004 | Krotkov et al. | |
| 2005/0114279 A1 | 5/2005 | Scarborough et al. | |
| 2005/0181340 A1 | 8/2005 | Haluck | |
| 2005/0216564 A1 | 9/2005 | Myers et al. | |
| 2005/0273384 A1 | 12/2005 | Fraser | |
| 2006/0106675 A1 | 5/2006 | Cohen et al. | |
| 2006/0106774 A1 | 5/2006 | Cohen et al. | |
| 2006/0224509 A1 | 10/2006 | Walker et al. | |
| 2007/0226260 A1 | 9/2007 | Williams et al. | |
| 2008/0127302 A1 | 5/2008 | Qvarfordt et al. | |
| 2008/0133347 A1 | 6/2008 | Josifovski et al. | |
| 2008/0147456 A1 | 6/2008 | Broder et al. | |
| 2009/0210937 A1 | 8/2009 | Kraft et al. | |
| 2009/0249477 A1 | 10/2009 | Punera | |
| 2009/0276839 A1 | 11/2009 | Peneder | |
| 2009/0325661 A1 | 12/2009 | Gross | |
| 2010/0100725 A1 | 4/2010 | Ozzie et al. | |
| 2010/0111396 A1 | 5/2010 | Boucheron | |
| 2010/0138313 A1 | 6/2010 | Findley | |
| 2010/0229223 A1 | 9/2010 | Shepard et al. | |
| 2010/0275114 A1 | 10/2010 | Bastos dos Santos et al. | |
| 2011/0035505 A1 | 2/2011 | Jakobsson | |
| 2011/0202994 A1 | 8/2011 | Hicks et al. | |
| 2012/0054834 A1 | 3/2012 | King | |
| 2012/0254940 A1* | 10/2012 | Raper | G06Q 20/4014 726/3 |
| 2012/0254964 A1 | 10/2012 | Kumar et al. | |
| 2013/0019286 A1 | 1/2013 | Barborak et al. | |
| 2013/0085942 A1 | 4/2013 | Shirol | |
| 2013/0145441 A1* | 6/2013 | Mujumdar | G06F 21/305 726/5 |
| 2013/0160095 A1 | 6/2013 | Seleznyov | |
| 2013/0285951 A1 | 10/2013 | Jeon et al. | |
| 2014/0047048 A1 | 2/2014 | Ail et al. | |
| 2014/0062650 A1 | 3/2014 | Yamada | |
| 2014/0173286 A1 | 6/2014 | Novak | |
| 2014/0181936 A1 | 6/2014 | Picard | |
| 2014/0250502 A1 | 9/2014 | Lauer | |
| 2014/0259145 A1* | 9/2014 | Khandelwal | H04L 63/1458 726/13 |
| 2014/0273963 A1 | 9/2014 | Su et al. | |
| 2015/0007289 A1 | 1/2015 | Godse | |
| 2015/0095981 A1 | 4/2015 | Adams | |
| 2015/0096020 A1 | 4/2015 | Adams et al. | |

FOREIGN PATENT DOCUMENTS

| | | |
|---|---|---|
| WO | 0067179 A2 | 11/2000 |
| WO | 0129708 A1 | 4/2001 |

OTHER PUBLICATIONS

Mind—A Brief Introduction, John R. Searle, 2004, Oxford University Press, pp. 62-67.*

What is Thought, Eric Baum, The MIT Press, 2004, pp. 33-65.*

Robotics, Science and Systems III, Wolfram Burgard, Oliver Brock, and Cyrill Stachniss, The MIT Press, 2008, pp. 41-48.*

Language and Mind, Chomsky, Oxford University Press, 2005, p. 62.*

Computing the Mind, Shimon Edelman, Oxford University Press, 2008, pp. 26-31.*

(56) References Cited

OTHER PUBLICATIONS

Noetics, Lawrence Krader, 2010, Peter Lang Publishing, pp. 551-553.*
Britannica Concise Encyclopedia, Encyclopedia Britannica, 2006, p. 537.*
Cognition—From Memory to Creativity, Weisberg, Reeves, 2013, John Wiley & Sons, pp. 519-527.*
The Way We Think, Fauconnier, 2010, Persues Books Group, Chapter 1, Chapter 13.*
Streetlights and Shadows, MIT Press, 2009, pp. 33-47.*
The future of the internet—and how to stop It, Yale University Press, 2008, Chapter(s) 1-9, [emphasis pp. 11-18].*
Islands of Genius, Treffert, 2010, Jessica Kingsley Publishing, pp. 120-129, 161-164.*
The Wisdom of Crowds, Surowiecki, Random House, 2004, pp. 1-35.*
Social Choice and Individual Values, Third Edition, 2012, pp. v-8.*
The Official CAPTCHA Site, "CAPTCHA: Telling Humans and Computers Apart Automatically," http://www.captcha.net/, retrieved Jun. 11, 2009 (4 pages).
ASIRRA—Microsoft Research, "ASSIRA," http://research.microsoft.com/en-us/umredmond/projects.asirra, retrieved Jun. 1, 2009 (3 pages).
KittenAuth—Projects—The PCSpy.com, "KittenAuth," http://www.thepcspy.com/kittenauth, retrieved Jun. 11, 2009 (5 pages).
U.S. Appl. No. 12/719,800, filed Mar. 8, 2010, "Dynamic Information-Based CAPTCHA Mechanisms".
U.S. Appl. No. 12/457,446, filed Jun. 11, 2009, "Distinguishing Humans From Computers".
U.S. Appl. No. 12/719,798, filed Mar. 8, 2010, "Dynamic CAPTCHA Mechanisms".
U.S. Appl. No. 13/899,146, filed May 21, 2011, "Enhanced CAPTCHAs".
U.S. Appl. No. 14/133,579, filed Dec. 18, 2013.
U.S. Appl. No. 14/133,577, filed Dec. 18, 2013.
About, Inc. "Intelligent Agents," retrieved Jun. 9, 2005, from http://psychology.about.com./od/intelligentagents/, 5 pages.
About, Inc., "Our Story," About, Inc., retrieved Jun. 9, 2005, from http://www.about.com, 2 pages.
About, Inc., "Welcome to About.com," retrieved Jun. 9, 2005, from http://www.about.com, 2 pages.
Applied Skills & Knowledge, LLC, "Make Skills-Based Routing Happen," Jun. 3, 2003, retrieved from http://www.appliedskills.com/whitepapers/files/Skills-basedRouting.pdf, 3 pages.
Barlas, "Hipbone Connects to Kana," Line56.com, Jan. 5, 2004, retrieved Jun. 8, 2005, from http://www.line56.com/print/default.asp?ArticleID=5255, 1 page.
Business Wire, "QuestionExchange.com Previews 'Name-Your-Price' Support for Open Source," Nov. 2, 1999, retrieved on May 5, 2009, from http://proquest.umi.com/pqdweb?index=17&did=45992258&SrchMode=1&sid=2&Fmt- =3 . . . , 4 pages.
Bystrom, "Information and Information sources in Tasks in varying complexity," Journal of the American Society for Information Science and Technology, May 2002, 53(7):581-591.
Calishain, "Yahoo! Service Offers More Advice than Expertise," May 6, 2002, retrieved Jul. 16, 2004, from http://www.infotoday.com/newsbreaks/nb020506-1.htm, 2 pages.
Cohen et al., "Using Corroborated Information About Users to Facilitate User Performance of Tasks," U.S. Appl. No. 10/991,339, filed Nov. 16, 2004.
Cohen et al., "Using Qualifications of Users to Facilitate User Performance of Tasks," U.S. Appl. No. 10/990,951, filed Nov. 16, 2004.
distributed.net, "distributed.net History & Timeline," Nov. 1, 2004, first disclosed 1997, retrieved Jun. 8, 2005, from http://www.distributed.net/history.php, 7 pages.
distributed.net, "The Organization," Mar. 8, 2005, first disclosed 1997, retrieved Jun. 8, 2005, from http://www.distributed.net/, 2 pages.
Doan, "MongoMusic Fans Include Microsoft," Forbes.com, Sep. 9, 2000, retrieved Jun. 9, 2005, from http://forbes.com/2000/09/09/feat2.html, 3 pages.
Dubaud, "Advice Site Resort to Legal Counsel," CNET, Jan. 4, 2002, retrieved Apr. 29, 2004, from http://news.com.com/2011-1088-801359.html, 3 pages.
Elance Inc., "Elance Online™—Everyday Outsourcing™," retrieved Jun. 9, 2005, from http://www.elance.com/c/static/main/displayhtml.pl?file=eol.html&module=home, 2 pages.
Elance, Inc., "Elance History," retrieved Jun. 8, 2005, from http://www.elance.com/c/static/main/displayhtml.pl?file=heritage.html, 3 pages.
elancer.us, "eLancer Homepage," retrieved Jun. 8, 2005, from http://www.elancer.us/, 2 pages.
Epinions, Inc., "Epinions.com homepage," retrieved Jun. 9, 2005, from http://www.epinions.com, 2 pages.
Espgame, "The ESP Game," retrieved Jun. 8, 2005, from http://www.espgame.org, 1 page.
Fox, "Can New Technology Revolutionize the Net?," Jun. 1, 2000, retrieved Jun. 8, 2005, from http://web.archive.org/web/20001018221958/www.cnet.com/insider/0-121949-7-1995365.html, 3 pages.
Freelancer, "Freelancer homepage," Innovate it, retrieved Jun. 8, 2005, from http://www.getafreelancer.com, 3 pages.
gonesilent.com, "GoneSilent homepage," Aug. 22, 2000, retrieved Jun. 8, 2005, from http://web.archive.org/web/20000822122731/www.gonesilent.com/about.html, 2 pages.
Google, "Ask a question, Set your Price. Get your Answer.," retrieved Jun. 9, 2005, from http://answers.google.com/answers/, 1 page.
Google, "Payment-On-Line (AOL, Compuserve, Internet, etc)," Oct. 20, 1994, retrieved Dec. 6, 2004, from http://groups-beta.google.com/group/misc.entrepreneurs/browse_thread/thread/80fcfl10252bb3f7/ff1c8 . . . , 3 pages.
Google, "Your Computer's Idle Time is too Precious to Waste," retrieved Jun. 9, 2005, from http://toolbar.google.com/dc/offerdc.html, 1 page.
Gunn, "Hey, buddy, can you spare some cycles?," CNN—The Netly News, Sep. 24, 1997, retrieved Jun. 8, 2005, from http://www.cnn.com/TECH/9709/24/netly.news/, 4 pages.
Hagel et al., "Go Slowly with Web Services," CIO Magazine, Feb. 15, 2002, retrieved from http://www.cio.com/archive/021502/keynote.html, 4 pages.
Hagel et al., "Your Next IT Strategy," Harvard Business Review, Oct. 2001, RO109G:105-113.
Hagel, "Out of the Box: Strategies for Achieving Profits today and Growth Through Web Services," Harvard Business School Publishing, 2002, Front Cover through Acknowledgements, Chapter 1, "Responding to Unmet Needs," and Chapter 2, "Web Services Create New Options," pp. i-xix and 1-42, 61 pages.
Harinarayan et al., "A Hybrid Machine/Human Computing Arrangement," U.S. Appl. No. 09/976,717, filed Oct. 12, 2001.
IEEE, "The Authorative Dictionary of IEEE Standard Terms," Seventh Edition, New York, IEEE Press, 2000, 6 pages.
Ingenio, Inc., "Ingenio™ homepage," retrieved Jun. 8, 2005, from http://www.ingenio.com/default.asp?TF=1, 2 pages.
Ingenio, Inc., "Introducing Ingenio™ Pay Per Call™," retrieved Jun. 8, 2005, from http://www.ingenio.com/documents/corp/home.asp, 2 pages.
Ingenio, Inc., "Keen—Your Personal Advisor," retrieved Jun. 8, 2005, from http://www.keen.com, 2 pages.
Ingenio, Inc., "Keen—Your Personal Advisor/Get Advice," retrieved Jun. 8, 2005, from http://www.keen.com/categories/get_answers.asp?SRCHT=0&search=&gid=0, 1 page.
Jupitermedia Corporation, "About jGuru.com: Overview," retrieved Jun. 9, 2005, from http://www.jguru.com/misc/about-overview.jsp, 2 pages.
Jupitermedia Corportation, "jGuru homepage," retrieved Jun. 9, 2005, from http://www.jguru.com, 5 pages.
Kana Inc., "Corporate Overview," retrieved Jun. 8, 2005, from http://www.kana.com/about/about.aspx, 2 pages.

(56) References Cited

OTHER PUBLICATIONS

Katz et al., "The Benefits of a Virtual Contact Center," MCI, Inc., May 2004, retrieved from http://global.mci.com/us/enterprise/insight/whitepapers/pdf/VirtualContactCtr.pdf, 7 pages.
keen.com, "What is Keen," retrieved Jun. 8, 2005, from http://www.keen.com/documents/homepage/wik_pop.asp?TID=gbFQnFLPstnUuFonMtBmHw, 1 page.
Keenan, "Auctioning answers the latest Net craze [Web auction site where users post questions & pay for the best one]," ComputerWorld Canada, Nov. 19, 1999, 15(23):15, retrieved May 5, 2009, from http://proquest.umi.com/pqdweb?index=16&did=413360071&SrchMode=1&sid=2&Fm- t=3 . . . , 4 pages.
Kenexa, "Call Centers," retrieved Jun. 8, 2005, from http://www.kenexa.com/ind_callcent.html, 3 pages.
Lynn, "Keeping Online Daters Honest," Wired News, Apr. 1, 2005, retrieved Apr. 4, 2005, from http://www.wired.com/news/print/0,1294,67083,00.html, 3 pages.
Marsh et al., "Managing Content Based on Reputation," U.S. Appl. No. 10/646,341, filed Aug. 22, 2003.
McCollum, "Finding the answers to technical questions," The Chronicle of Higher Education, Oct. 15, 1999, 46(8):A49, retrieved May 5, 2009, from http://proquest.umi.com/pqdweb?index=0&did=45532118&SrchMode=1&sid=1&Fmt=- 3& . . . , 4 pages.
Microsoft Corporation, "Microsoft Acquires MongoMusic," Sep. 13, 2000, retrieved Jun. 9, 2005, from http://www.microsoft.com/presspass/press/2000/sept00/mongopr.mspx, 2 pages.
Microsoft Press Computer Dictionary, Third Edition, 1997, 8 pages.
mopg.com, "Massive Online Role Playing Game—homepage," retrieved Jun. 8, 2005, http://www.mpog.com, 2 pages.
Mori et al., "Breaking a Visual CAPTCHA," last modified Dec. 15, 2003, retrieved Jun. 8, 2005, from http://www.cs.berkeley.edu/.about.mori/gimpy/gimpy.html, 4 pages.
Mortensen et al., "Controlling Interactions with Users to Facilitate User Performance of Tasks," U.S. Appl. No. 10/990,771, filed Nov. 16, 2004.
Mossberg, "GuruNet as a Reference Tool Goes Beyond Search Engines," Mar. 6, 2003, retrieved Jul. 20, 2004, from http://www.ptech.wsj.com/archive/ptech-20030306.html, 3 pages.
mpogd.com, "Multiplayer Online Games Directory—homepage," retrieved Jun. 8, 2005, from http://www.mpogd.com, 1 page.
MyPoints, "About Spending," retrieved Nov. 23, 2004, from http://www.mypoints.com/mp/dstatial.show?isref=nmhp.popup.aboutspending.default, 1 page.
MyPoints, "Earning Points with MyPoints," retrieved Nov. 23, 2004, from http://www.mypoints.com/mp/dstatial.show?isref=nmhp.popup.aboutearning.de- fault, 1 page.
MyPoints, "FAQs," retrieved Nov. 23, 2004, from http://www.mypoints.com/mp/dstatial.show?isref=nmhp.popup.faq.default, 1 page.
MyPoints, "Join MyPoints Now!" retrieved Nov. 23, 2004, from http://www.mypoints.com/?MCK=ccb67d8c41a3819b, 4 pages.
MyPoints, "What is BonusMail®?," retrieved Nov. 23, 2004, from http://www.mypoints.com/mp/dstatial.show?isref=nmhp.popup.bonusmail.default, 1 page.
MyPoints, "What is MyPoints," retrieved Nov. 23, 2004, from http://www.mypoints.com/mp/dstatial.show?isref=nmhp.popup.whatis.default, 1 page.
Newton's Telecom Dictionary, 20th Updated and Expanded Edition, CMP Books, Mar. 2004, 6 pages.
Nortel Networks, "Beyond ACD—The advantages of Skill-based Routing in Today's Contact Centers," Mar. 7, 2003, retrieved from http://www.nortelnetworks.com/solutions/ccvp/collateral/nn103640-030703.pdf, 12 pages.
omgn.com, "Online Multiplayer Games Network—homepage," retrieved Jun. 8, 2005, http://www.omgn.com, 2 pages.
Open Mind, "Frequently Asked Questions about the Open Mind Initiative," retrieved Nov. 16, 2004, from http://www.openmind.org/FAQs.html, 3 pages.
pgdp.net, "Project Gutenberg's Distributed Proofreaders—homepage," retrieved Jun. 9, 2005, from http://www.pgdp.net/c/default.php, 4 pages.
Questionexchange, "About Us," Mar. 3, 2000, retrieved Dec. 22, 2009, from http://web.archive.org/web/20000303191502/www.questionexchange.com/about.html, 3 pages.
Questionexchange, "Frequently Asked Questions by Customers," Jan. 28, 2000, retrieved Dec. 22, 2009, from http://web.archive.org/web/20000128045711/www.questionexchange.com/faqcustomer.html, 7 pages.
Questionexchange, "Frequently Asked Questions by Experts," Nov. 28, 1999, retrieved Dec. 22, 2009, from http://web.archive.org/web/19991128184546/www.questionexchange.com/faqexpert.html, 9 pages.
Questionexchange, "General Information: Fields with an asterisk (*) are required," Feb. 3, 2000, retrieved Dec. 22, 2009, from http://web.archive.org/web/20000203221310/questionexchange.com/servlet1/newSimple . . . , 2 pages.
Questionexchange, "Homepage," Mar. 3, 2000, retrieved on Dec. 22, 2009, from http://web.archive.org/web/20000303171025/http://www.questionexchange.com/, 2 pages.
Questionexchange, "How to Answer," Mar. 4, 2000, retrieved Dec. 22, 2009, from http://web.archive.org/web/20000304042129/www.questionexchange.com/howToAnswe . . . , 2 pages.
Questionexchange, "How to Ask a Question," Feb. 3, 2000, retrieved Dec. 22, 2009, from http://web.archive.org/web/20000203182049/questionexchange.com/howTo-AskAQuestio . . . , 2 pages.
Questionexchange, "Login Information Page," Mar. 11, 2000, retrieved Dec. 22, 2009, from http://web.archive.org/web/20000311014941/www.questionexchange.com/servlet1/show . . . , 3 pages.
Questionexchange, "Open Questions ['Q' through 'How to implement a InterBase databse in C++?']," Feb. 4, 2000, retrieved Dec. 22, 2009, from http://web.archive.org/web/20000204035521/questionexchange.com/servlet1/showBrows . . . , 3 pages.
Questionexchange, "Open Questions ['Win32' through 'HELP with LWP HTML']," Mar. 10, 2000, retrieved on Dec. 22, 2009, from http://web.archive.org/web/20000310210121/www.questionexchange.com/servletl/show . . . , 3 pages.
Questionexchange, "User Agreement," Jan. 19, 2000, retrieved Dec. 22, 2009, from http://web.archive.org/web/20000119200457/questionexchange.com/userAgreement.html, 8 pages.
Rhodes, "The Wearable Remembrance Agent: A System for Augmented Memory," Appeared in Personal Technologies Journal Special Issue on Wearable Computing, first disclosed Oct. 1997, Dec. 1997, retrieved Jun. 9, 2005, from http://www.bradleyrhodes.com/Papers/wear-ra-personaltech/, 1(4):218-224.
Serena Software, Inc., "Serena™: Automating Change," retrieved Jun. 9, 2005, from http://www.serena.com, 1 page.
seti.org, "SETI Institute—homepage," retrieved Jun. 9, 2005, from http://www.seti.org/site/pp.asp?c=ktJ2J9MMIsE&b=178025, 3 pages.
Siebel Systems, Inc., "Siebel—homepage," retrieved Jun. 8, 2005, from http://www.siebel.com/, 3 pages.
Signh, "Open Mind: common sense—Teaching computers the stuff we all know," retrieved Jun. 9, 2005, from http://commonsense.media.mit.edu/cgi-bin/search.cgi, 2 pages.
Signh, "The Open Mind Common Sense Project," Jan. 2, 2002, retrieved Jun. 9, 2005, from http://www.kurzweilai.net/articles/art0371.html, 24 pages.
Spice, "CMU Student Taps Brain's Game Skills," Post-Gazette.com, Oct. 5, 2003, retrieved Jun. 8, 2005, from http://www.post-gazette.com/pg/03278/228349.stm, 5 pages.
spogg.com, "Spogg.com—homepage," retrieved Jun. 8, 2005, from http://www.spogg.com, 2 pages.
Sun Microsystems, Inc., "Grid—The Competitive Advantage," Aug. 2004, retrieved Jun. 9, 2005, from http://www.sun.com/solutions/documents/articles/grid_adv_aa.xml?null, 2 pages.
Sun Microsystems, Inc., "Products & Technologies: Java Technology," retrieved Jun. 9, 2005, from http://java.sun.com, 2 pages.
Sun Microsystems, Inc., "The Jini Technology Series: JavaSpaces Principles, Patterns, and Practice," retrieved Jun. 9, 2005, from http://java.sun.com/docs/books/jini/javaspaces/, 2 pages.
Taylor et al., "Work organisation, control and the experience of work in call centers," 15th Annual Employment Research Unit Conference, University of Cardiff, Sep. 2000, 19 pages.
Topcoder, Inc., "Topcoder—homepage," retrieved Jun. 8, 2005, from http://www.topcoder.com/, 2 pages.

(56) References Cited

OTHER PUBLICATIONS

Truedater, "Frequently Asked Questions," retrieved Apr. 4, 2005, from http://www.truedater.com/index.php?action=faqs, 2 pages.
University of California, "What is SETI@home?," retrieved Jun. 9, 2005, from http://setiathome.ssl.berkeley.edu./, 1 page.
White, "How Computers Work," Que Publishing 7th Edition, Oct. 15, 2003, 23 pages.
Wilson, "Anti-Social Software," Apr. 30, 2004, retrieved Aug. 26, 2005, from http://www.brendonwilson.com/profile/000156.shtml, 5 pages.
Wolverton, "Yahoo Launches Advice Site," Apr. 29, 2002, retrieved Apr. 29, 2004, from http://news.com.com/2102-1017_3894968.html?tag=st.util.print, 2 pages.

* cited by examiner

US 10,438,225 B1

GAME-BASED AUTOMATED AGENT DETECTION

BACKGROUND

In modern computing, computer programs that automate human tasks have become more common. Certain computer programs, which are referred to as automated robots or so-called "bots," provide tools that automate tasks, such as crawling through web pages to scan and gather keywords, text, and links. Computer programs can also masquerade as humans to gather information from websites, such as customer information, or automatically purchase large quantities of a desired commodity or a commodity being sold at a promotional price. Since a computer program can act automatically and more rapidly than a human, a computer program can compromise data for a large number of accounts or assist a single buyer in purchasing large quantities of a commodity in a short time span.

In a typical completely automated public Turing test to tell computers and humans apart (CAPTCHA), a computer provides an entity attempting to access a network resource with a test, the computer receives a response to the test from the user, and the computer evaluates whether or not the response to the test is correct. A CAPTCHA is designed to provide a test that is relatively simple for a human to solve, but, at the same time, poses a challenge for a computer to decipher. For example, a CAPTCHA might require a user to type letters or digits that appear in an image. Such an image is often distorted in some fashion to hinder a computer from using optical character recognition (OCR) technology to read the letters or digits that appear in the image. As the image is relatively easy to discern by a human, but is difficult for a computer to discern in an automated fashion, a correct solution to the test is presumed to have been submitted by a human.

CAPTCHAs are premised upon the rationale that humans solve visual puzzles more accurately than computers. However, as approaches for automatically circumventing CAPTCHAs have become more sophisticated, computer programs have been able to determine the text or digits within the CAPTCHAs with increased accuracy. To combat this escalation in program sophistication, CAPTCHAs have also evolved in an attempt to improve the security that they provide. Some modern CAPTCHAs provide more sophisticated tests, such as tests that require a user to distinguish real-world features appearing in images. Such a test might require a user to select a particular type of image from a group of images. For example, distinguishing a photograph of a dog from a photograph of a cat is simple for a human to accomplish, but such a task remains relatively difficult for a computer program to solve with consistency.

BRIEF DESCRIPTION OF THE DRAWINGS

Various embodiments in accordance with the present disclosure will be described with reference to the drawings, in which.

DETAILED DESCRIPTION

Figure 1:
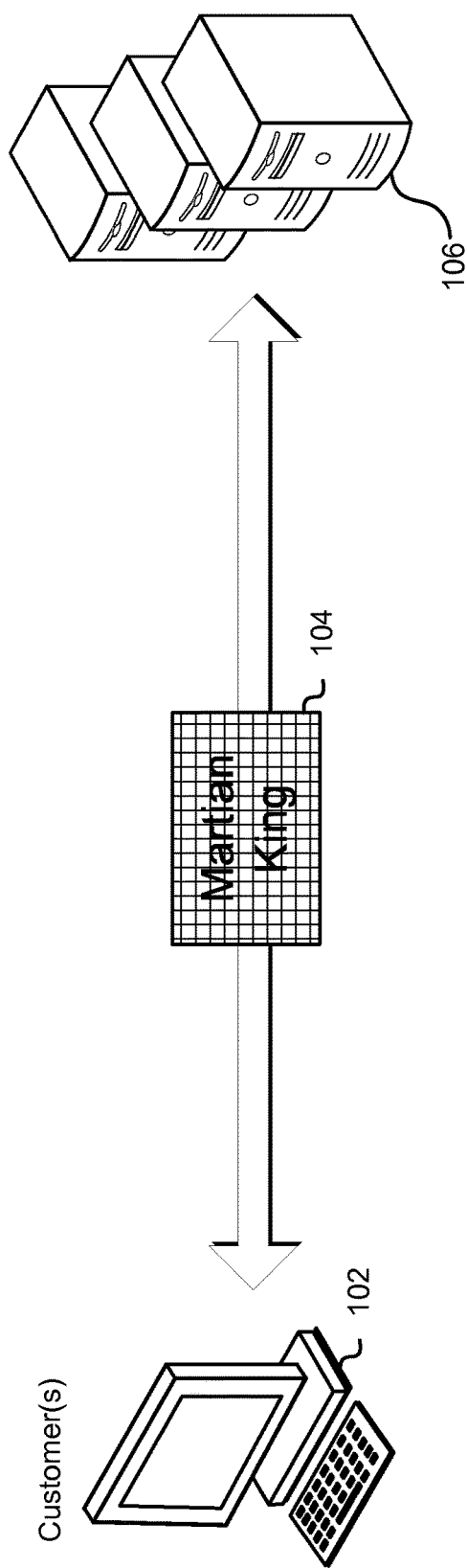
FIG. 1 shows an environment illustrating CAPTCHA in accordance with various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for differentiating between human requests and automated agent requests received at one or more servers of an online retailer. The online retailer may operate an online marketplace from which customers may purchase goods or services. One or more services or servers of the online retailer may monitor incoming requests and determine, based at least in part on the request and information associated with the request, the probability that the request has been generated by an automated agent (also referred to as a bot). The information associated with the request may include information corresponding to a customer session, customer purchase history, browser history, number and frequency of the requests, Internet Protocol (IP) address corresponding to the requests or any other information suitable to determining the probability of the request having been generated by an automated agent. If it is determined that the probability of a request being generated by an automated agent is above a threshold, the request may be redirected to a CAPTCHA service responsible for generating a CAPTCHA (also referred to as a security check) configured to determine whether the request was generated by a human. A security check may also be generated, by the CAPTCHA service, for particular types of requests, such as a password reset request, purchase requests, requests to update and/or change customer account information. For example, one or more services or servers of the online retailer may receive a request to purchase an item offered for sale on the online market place. The request may be redirected to the CAPTCHA service and the CAPTCHA service may determine based at least in part on the customers purchase history whether to provide a security check in response to the request before processing the purchase request.

A variety of different CAPTCHAs may be generated and used to tell the difference between humans and automated agents in accordance with the present disclosure. A CAPTCHA may be created using one or more advertised products and the customer may be required to solve the CAPTCHA by guessing the price of the displayed products. The customer may select a price to guess from a drop down menu or enter the price in a text-entry field displayed by the customer's computing device. The customer's input may be collected and used to update market data corresponding to the advertised products and customer information. Optionally, a discount or reward may be offered for correctly solving the security check. For example, the user may be presented with a CAPTCHA displaying four advertised products and asking the user to enter a price through a drop down menu. Once the puzzle is solved, the customer may proceed or learn more about the advertised products and the market data may be collected. Furthermore, the user may be notified if the price of the particular product guessed changes and/or approaches the customer's guess.

The CAPTCHA service may also generate security checks based on information about the customer's history, such as purchase history or browser history. The CAPTCHA service may access information corresponding to items customers purchased, reviews customers have read, products customers have viewed, locations customers have been and any other information collected about the customer's interaction with the online retailer. Information corresponding to customers of the online retailer may be collected by one or more services or servers of the online retailer. The CAPTCHA service may access the information through appropriately configured application program interface (API) calls transmitted to the one or more services or servers of the online retailer responsible for collecting and/or aggregating customer information. The security check may be generated based at least in part on information received corresponding to the customer responsible for transmitting the request. For example, one or more services or servers of the online retailer may determine that a particular request may have been generated by an automated agent and the request may be redirected to the CAPTCHA service and the CAPTCHA may determine a customer account associated with the request. In response to the request the CAPTCHA service or one or more services or servers of the online retailer may determine one or more electronic books included in the customer's purchase history and generate a CAPTCHA based at least in part on the electronic books included in the customer's purchase history. The security check may include quotes from electronic books the customer has purchased and ask which one of these quotes is incorrect. The security check may then be transmitted in response to the request.

The CAPTCHA service may receive a request, where the request was transmitted from a first device (also referred to as an access device) and generate a security check to be transmitted to a second device (also referred to as an authentication device) where the second device is not the device responsible for transmitting the request. The second device may be a device the customer has registered with the online retailer. The CAPTCHA may require the customer to interact with one or more sensors of the second device. For example, if the user has registered a second device with a front facing camera, the transmitted security check may require the customer to "look up," "look down," and/or "roll your eyes." The second device may capture sensor information and transmit the results back to the CAPTCHA service in order to determine the results of the security check. The CAPTCHA service may, upon a determination that the security check has passed, transmit an acknowledgment to one or more services or servers of the online retailer enabling the request to be processed. A variety of different security checks may be transmitted to the second device requiring input from one or more sensors including accelerometers, touchscreens, hard buttons, infrared sensors, distance meters, global position satellite (GPS) sensors, antennas or any other device connected the second device capable of receiving an input.

One or more services of the online retailer may redirect a request to the CAPTCHA service in order to complete processing of a purchase request. For example, one or more services of the online retailer may receive a purchase request associated with a customer account. The one or more services may then determine to redirect the request to the CAPTCHA service based at least in part on the customer account associated with the purchase request. For example, when a customer's account information indicates that the customer normally purchases electronic goods but the purchase request includes an expensive piece of jewelry, the request may be redirected to the CAPTCHA service to verify the humanity of the requester. This may prevent an automated agent designed to commit fraud from completing a fraudulent transaction. Once the purchase request is redirected to the CAPTCHA service, the CAPTCHA service may then generate a security check in order to process the payment and finalize the request to purchase the jewelry. The security check may be based on products related to the item being purchased such as accessories for the item. Correctly solving the security check may provide discounts or promotional offers. The security check may also be used to provide useful information such as asking the customer to write a review for the product. For example, the customer's purchase history may indicate that the customer has recently purchased the first book in a series of books. The customer may attempt to purchase the second book in the series of books and the security check may ask the customer to write a review of the first book. One or more services or servers of the online retailer may analyze the review in order to determine if the security check has been passed.

In at least one embodiment, one or more services of the online retailer can map or receive the browser ID associated with the customer from the browser utilized by the customer. The mapped or received browser ID can be used to provide targeted advertisements to the user. For example, when a user navigates to the product detail page of the electronic marketplace, the online retailer can register an interest with one or more services using the user's browser ID or other information suitable for associating the interest with the customer. Furthermore, the CAPTCHA service or one or more other services of the online retailer may associate other information with the registered interest. For example, the CAPTCHA service may receive customer perceived price information associated with a particular item offered for sale on the electronic marketplace and associate the price information with the register interest. When the user then browses to a web page that requests a security check, the CAPTCHA service can request a targeted advertisement from the electronic marketplace corresponding to the customer's registered interest. In some examples, this type of targeted advertisement can be displayed with a notification or included as a link within the notification indicating change in the list price (i.e., the price of the item offered for sale on the electronic marketplace) of the register interest relative to the customer perceived price. It should be noted that while certain examples describe receiving a request to provide content to a web page, the request for and provisioning of a reminder event can be implemented across various mediums (e.g., Television, mobile phones or applications, video games, etc.) and to native applications in addition to browsers.

Accordingly, FIG. 1 shows an example of an environment that includes a CAPTCHA service in accordance with the present disclosure. Customers 102 (also referred to as users) operate computing devices which may communicate over a network with an online retailer 106. The computing device operated by the customers 102 may be any suitable computing device such as a desktop, laptop, smartphone, tablet, electronic book reader, smart watch or other smart accessory (e.g., glasses) or any other device capable of interacting with an online retailer 106. The customers 102 may interact with the online retailer using a web browser or other application executed by the computing device. The network may be any suitable network such as the Internet, a local area network, wide area network or any other suitable communications network and/or other networks noted herein and/or combinations of networks. To enable the customers 102 to interact with the online retailer 106, the computing device may transmit one or more Hypertext Transfer Protocol (HTTP) requests over the network to one or more web servers operated by the online retailer 106. The web servers may be responsible for delivering the website and associated content to the customer 102 through computing devices in response to the one or more HTTP requests received over the network.

The online retailer 106 may operate one or more services configured to detect automated agents such as a bot detection service, described in greater detail below in connection with FIGS. 2A-2B. The online retailer 106 may receive one or more requests from customers 102 over the network and stream the requests to the bot detection service. The bot detection service may be responsible for redirecting requests suspected of being generated by an automated agent to a CAPTCHA service, described in greater detail below in connection with FIGS. 2A-2B. The CAPTCHA service may generate a CAPTCHA 104 (also referred to as a security check) and cause the security check 104 to be transmitted in response to the request. The customers 102 may complete the security check 104 and return the completed security check 104 to the online retailer 106. The CAPTCHA service or one or more other services of the online retailer 106 may determine, based at least in part on the returned security check 104, whether to process the request or deny the request.

Figure 2A:
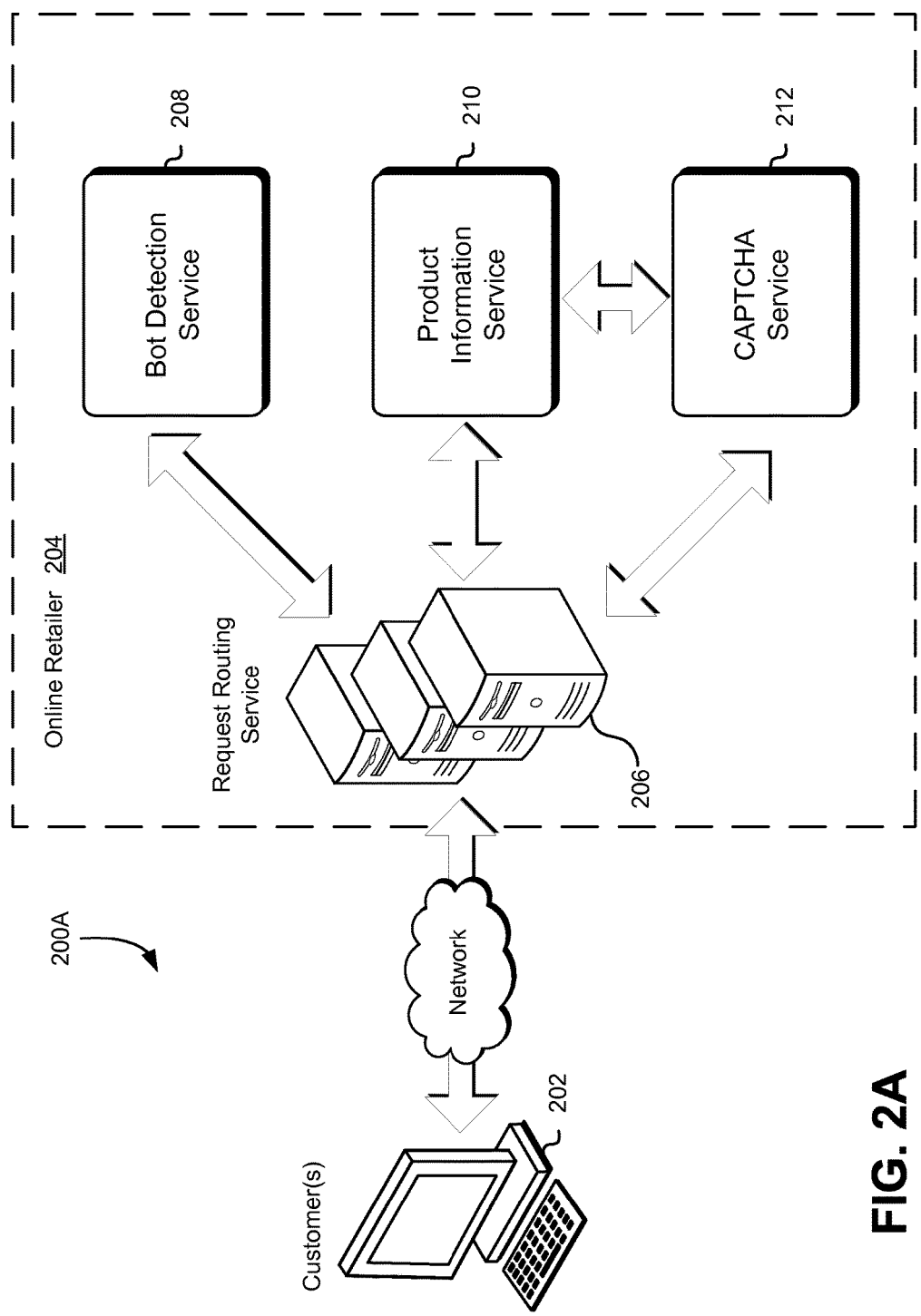
FIG. 2A shows an environment illustrating an online retailer in accordance with various aspects of the present disclosure.

FIG. 2A shows an environment 200A in which customers 202 may interact with an online retailer 204. The online retailer may operate a website that provides an online marketplace where customers 202 may purchase and offer for sale various goods and services. The customers 202 may transmit requests to access various resources of the online retailer 204. For example, customers 202 may, using a computing device executing a web browser, navigate the online retailer's 204 website searching for a particular item. The customers' 202 computing device may transmit one or more HTTP requests to request routing service 206 of the online retailer 204. The request routing service 206 may be a collection of computing resources collectively configured to receive HTTP requests and direct the HTTP requests to one or more other services of the online retailer. The request routing service 206 may direct requests using HTTP redirect or other routing techniques. The request routing servicer 206 may be responsible for directing requests to the appropriate service of the online retailer 204 for processing. The request routing service 206 may stream and/or transmit customers' 202 requests to the bot detection service 208. The bot detection service 208 may be a collection of computing resources collectively configured to receive requests and calculate, based at least in part on information corresponding to the requests, a score corresponding to the probability or likelihood that the requests were generated by an automated agent.

The bot detection service 208 may receive the requests or copies of the requests and determine a probability of a particular request being generated by an automated agent. The bot detection service 208 may determine the probability of a particular request being generated by an automated agent contemporaneously with receiving the request from the request routing service 206. While probabilities are used for illustration purposes, different calculations may be performed in accordance with the present disclosure, such as calculations calculated so as to generate a score for each request, where the scores are correlated to the probability of the request having been generated by an automated agent. The bot detection service 208 may also monitor requests over a period of time in order to determine the probability of the request being generated by an automated agent. For example, the bot detection service 208 may monitor all of the requests from a particular customer's current session and determine the probability of the requests being generated by an automated agent. The bot detection service 208 may determine the probability of a particular request(s) being generated by an automated agent and associate the probability with the request. In various embodiments, the bot detection service 208 receives a copy of the request and returns, to the request routing service 206, the probability of the request being generated by an automated agent and information identifying the request. The bot detection service 208 may transmit the request and the associated probability to the request routing service 206 and the request routing service 206 may determine how to process the request based at least in part on the associated probability. The bot detection service 208 may also redirect the request to the CAPTCHA service 212 based at least in part on the probability of the request being generated by an automated agent. The CAPTCHA service 212 may be a collection of computing resources collectively configured to generate security checks capable of distinguishing humans from automated agents.

The request routing service 206 may receive information from the bot detection service 208 corresponding to the requests transmitted from customers 202. The request routing service 206 may then redirect the requests based at least in part on the information received from the bot detection service 208. For example, the request routing service 206 may receive information from the bot detection service 208 indicating that one or more requests may have been transmitted by an automated agent. The request routing service 206 may then redirect at least one of the one or more requests to the CAPTCHA service 212. The CAPTCHA service 212 may generate a security check configured to determine if the request was generated by a human or an automated agent. The CAPTCHA service 212 may generate the security check based at least in part on information received from one or more other services such as a product information service 210. The product information service 210 may generate information corresponding to goods and services offered for sale on the online marketplace as well as information corresponding to customers 202 of the online retailer 204. The product information service 210 may maintain information corresponding to particular products and the particular products classification. For example, the product information service 210 may maintain a catalog of product images and the corresponding product classification such as sportswear, portable electronics or kitchen appliances.

The CAPTCHA service 212 may incorporate this information into one or more security checks. For example, the security check may contain a series of images and ask the customer to organize the images into the appropriate classification. The CAPTCHA service 212 or one or more other services of the online retailer may alter the images such that an automated agent may not recognize the image. For example, the automated agent may receive one or more images included in a security check, hash the images and compare the hashes of the images to a collection of hashes in order to determine an item the image represents. The images included in the security check may be altered such that a hash of the image results in a different hash value. Furthermore, the images may also be altered or selected such that a hash of the image generates a collision with the hash of a different image. Altering the image may include flipping one or more pixels, adding one or more pixels or lines of pixels, adding one or more comments inside a comment field associated with the image, resizing, rotating, distorting, adding a watermark, cropping, shrinking, adding one or more artifacts or any other technique capable of altering the image such that the hash of the image is altered. The images may also be altered such that the item represented by the image may still be recognized by the customer.

The images and the classification may be based at least in part on information received from the product information service 210. The product information service 210 may be a collection of computing resources collectively configured to maintain information corresponding to goods and services offered for sale on the electronic commerce website operated by the online retailer. The product information service 210 may include one or more storage devices configured to store images and other information associated with goods and services offered for sale by the online retailer. The CAPTCHA service 212 may also receive particular requests or particular types of requests directly from the request routing service 206 regardless of the probability, as determined by the bot detection service 208, of the particular request. For example, the request routing service 206 may redirect all requests to modify customer account information to the CAPTCHA service 212.

The CAPTCHA service 212 or one or more other services of the online retailers 204 may also register one or more other devices to use in connection with the CAPTCHA service 212. For example, customers 202 may register a second device such as a smartphone configured to receive security checks from the CAPTCHA service 212. When the CAPTCHA service 212 receives a request corresponding to the customers' 202 account the CAPTCHA service 212 may transmit the security check directly to the customers' 202 second device. The customers 202 may solve the security check on the second device and the second device may transmit the results of the security check back to the CAPTCHA service 212. In various embodiments, the customers 202 may solve the security check on the second device and receive on the second device, in response to correctly solving the security check, information to be entered into the device responsible for generating the request in order to enable one or more services of the online service provider to process the request. If the security check returned from the second device is completed successfully, the CAPTCHA service 212 may redirect the request to the appropriate service of the online retailer or otherwise cause the request to be processed. If the security check returned from the second device is not completed successfully the CAPTCHA service 212 may cause the request to be denied or otherwise remain unprocessed.

The CAPTCHA service 212 may also be offered as a service to one or more users or organizations of users such that the one or more users or organizations of users may mitigate automated agent activity. For example, an organization may operate a website using one or more computing resources of the online retailer, the online retailer may further offer the CAPTCHA service 212 and/or the bot detection service 208 as a service to the organization. The organization may then provide security checks to users of the website in order to differentiate human users of the website and automated agents as described in the present disclosure. Users of the website may consent to allowing the online retailer and one or more users or organizations of users to share information corresponding to the users of the website. This information may be used by the CAPTCHA service 212 to generate security checks.

Figure 2B:
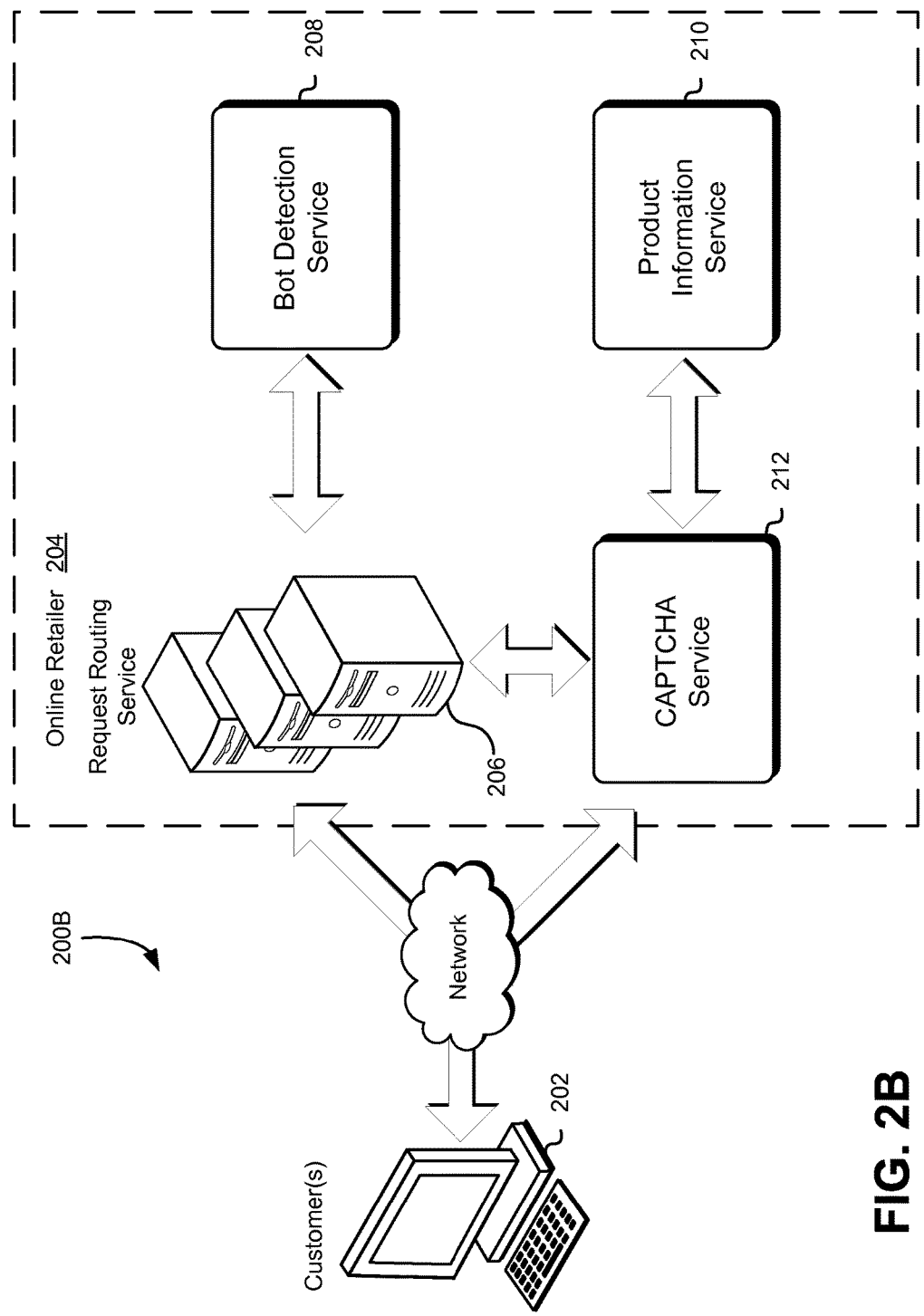
FIG. 2B shows an environment illustrating an online retailer in accordance with various aspects of the present disclosure.

FIG. 2B shows an alternative environment 200B in accordance with the present disclosure in which customers 202 may interact with an online retailer 204. The online retailer may operate a website that provides an online marketplace where customers 202 may purchase and offer for sale various goods and services. The customers 202 may transmit requests to access various resources of the online retailer 204. The request routing service 206 may receive the requests and direct the request to one or more services of the online retailer. The requests or a determined sample size of the request may also be directed to the bot detection service 208 in order to calculate a score for at least one request corresponding to the probability of the at least one request having been generated by a bot. If the bot detection service 208 determines that the score for the at least one request is over a threshold indicating that the request may have been generated by a bot, the bot detection service 208 may transmit information to the request routing service 206 indicating that the particular requestor associated with the at least one request may be a bot.

The request routing service 206 may then cause at least a portion of any further requests from the particular requestor to be transmitted to the CAPTCHA service 212. Although the CAPTCHA service is shown as a separate element from the request routing service in FIG. 2B, the CAPTCHA service 212 may be incorporated into the request routing service 206 in accordance with the present disclosure. Returning to FIG. 2B, in an embodiment, the CAPTCHA service may receive requests from one or more requestors indicated by the bot detection service 208 as probable bots. The CAPTCHA service 212 may transmit in response to the request a security check. The security check may be pre-generated and retrieved from one or more storage devices. The CAPTCHA service 212 may also retrieve information from the product information service 210 for use in the security check.

In various embodiments, the CAPTCHA service 212 causes the processing of the received request to be slowed or halted based at least in part on the probability of the request having been generated by a bot. For example, the bot detection service 208 may determine based at least in part on a sample of the requests received by the request routing service 206 that a particular requestor associated with one or more requests may be a bot. The request routing service 206 or one or more other services of the online retailer 204 may cause all requests from the particular requestor to be transmitted to the CAPTCHA service 212. The CAPTCHA service 212 may receive the request and wait a period of time before transmitting a response to the particular requestor. The period of time may be any suitable period of time such that the period of time causes the processing of the request to be delayed.

Figure 3:
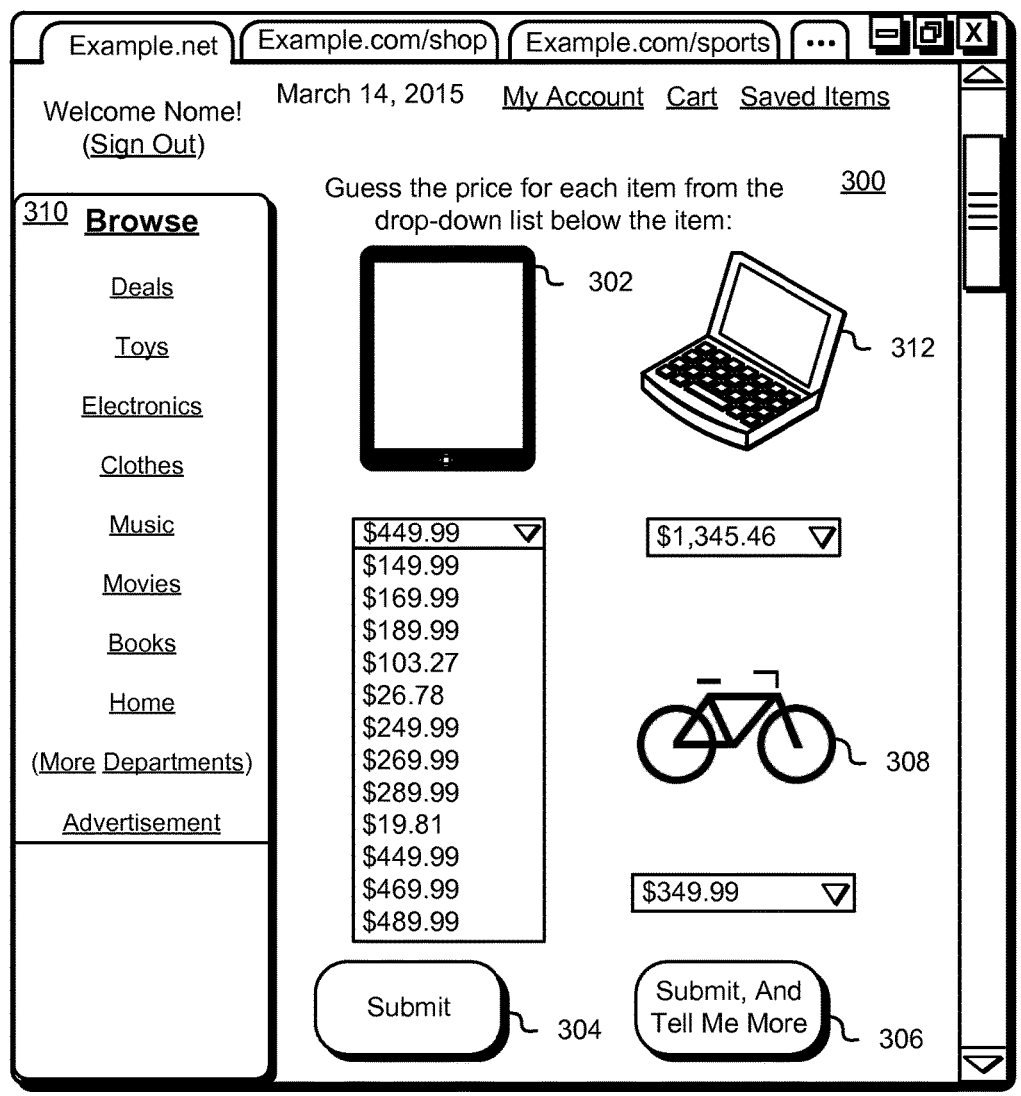
FIG. 3 shows a diagram illustrating a web page in accordance with various aspects of the present disclosure.

FIG. 3 shows a webpage 300 which may be displayed by an application executed by a computing device enabling a customer to interact with an electronic commerce website operated by an online retailer. As illustrated in FIG. 3, the webpage 300 includes various graphical user interface elements that enable navigation throughout the electronic commerce website of which the webpage 300 is a part. The webpage 300 may be displayed by various applications, such as a mobile application or web browser. In this example, the webpage 300 includes various navigational features. For instance, on the left-hand side of the webpage 300, various links 310 may link to one or more other webpages that contain additional content corresponding to department pages and/or category pages. The department and/or category pages may correspond to department and category information used by the product information service. In this example, the links appear as textual words which enable the links to be selected using an appropriate input device such as a keyboard, mouse, touchscreen or other input device. Selection of one of the links 310 may cause an application displaying the webpage 300 to submit, pursuant to a URL associated with the selected link by the programming of the webpage 300, an HTTP request for the content associated with the link to a server that provided the webpage 300 or another server. In this example, the webpage 300 also includes a graphical user element configured as a "submit" button 304. The submit button 304 may be a graphical user interface element of the webpage 300 where the underlying code of the webpage 300 is configured such that selection by an input device of the submit button 304 causes information corresponding to the security check displayed on the webpage 300 to be transmitted to one or more servers of the online retailer.

The webpage 300 may also include a graphical user element configured as a "submit, and tell me more" button 306. The submit and tell me more button 306 may be a graphical user interface element of the webpage 300 where the underlying code of the webpage 300 is configured such that selection by an input device of the submit and tell me more button 306 causes information corresponding to the security check display on the webpage 300 to be transmitted to one or more servers of the online retailer and causes the application displaying the webpage 300 to navigate to a webpage containing information corresponding to the items displayed in the security check on the webpage 300. In this example, the webpage 300 contains a security check with three items requiring the customer to select the price of the item from a drop down menu. The security check may be implemented as a game where the customer guesses the price of various items in order to solve the security check. The security check may be configured to ask the responder for information corresponding to what the responder believes the average customer may be willing to pay for the items displayed in the security check. The items include a tablet 302, a laptop 312 and a bicycle 308 and may be selected based at least in part on the customer's history such as items the customer has recently viewed. Furthermore, the items displayed in the security may be services offered by the online retailer or one or more other organizations, for example, the services may include an installation service, delivery service or other service. The security check displayed on the webpage 300 may contain a presentation of the items such as a graphical representation of the items, which could be text and/or a drawing, photograph, description, identification number, trademark, video clip, audio clip or any other representation capable of representing the items. The customer may select the price from the drop down menu using an input device, where the price corresponds to the price the average customer may be willing to pay for the particular item.

Other variations of the security check may be used in accordance with the present disclosure. For example, the drop down menus may include classifications or categories for the items displayed and the customer may be required to correctly select the appropriate category for one or more items displayed in order to solve the security check. In this example, the tablet 302 and the laptop 312 may be classified as electronics and the bicycle may be classified as sports equipment. The customer may be required to select the correct classification for the items displayed on the webpage 300 in order to proceed. The customer may be offered a promotional price on a particular item, an account credit or a discount for successfully completing the security check.

The items selected to include in the security check may be selected based at least in part on a variety of different techniques. At least a portion of the items may be selected based at least in part on the number of times the items have been viewed. For example, items viewed more often may be more well known among customers of the online retailer and information about the items, such as price, may also be well known. Items viewed less often may be less well known among customers of the online retailer than more frequently viewed items. The CAPTCHA service may select items based at least in part on the number of times a particular item has been viewed. Items may also be selected based on how many times the items have been viewed in a particular geographic area.

The online retailer may determine a particular geographic area based at least in part on an IP address associated with a request to view an item. The online retailer may also determine an item's relative popularity based at least in part on aggregated purchase histories of customers in geographic areas associated with an IP address. Items purchased more often in a geographic area may be considered more popular relative to items purchased less often in the geographic area. The CAPTCHA service may then select an item based at least in part on an IP address of the requestor and information corresponding to the relative popularity of items in the geographic area associated with the IP address. For example, outdoor items may be more popular in California and Florida and the CAPTCHA service may select outdoor items to include in a security check in response to a request transmitted from California. Items for the security check may also be selected based at least in part on the time of day or year. For example, if the customer has provided information indicating the customer's birthday or anniversary, particular item associated with birthdays and anniversaries may be selected during this time of year. Furthermore, items may be selected based on the time of day, for example, items associated with breakfast may be selected during morning hours. Items may also be selected based on browser or navigational history. For example, the items may be selected based at least in part on one or more items viewed during a single browsing session.

The webpage 300 may be caused to be displayed for a variety of reasons as described above in connection with FIGS. 2A-2B. For example, the webpage 300 may be displayed because the bot detection service indicated to the request routing service that a request from the customer may have been generated by an automated agent. The webpage 300 may also be displayed for a variety of other reasons. For example, the request routing service may redirect request to the CAPTCHA service at random, after processing a number of requests, at a particular time of day or year or any other reason suitable for mitigating automated agent activity. Completion of the security check displayed on the webpage 300 may cause the request to be processed by one or more services or servers of the online retailer. Furthermore, if the customer selects the submit button 304 and tell me more button 306, the customer may be redirected to a webpage containing information corresponding to the items included in the security check. The webpage containing information corresponding to the items included in the security check may include pricing and purchase information. In various embodiments, the submit button 304 and tell me more button 306 may redirect the customer even if the security check is not completed or is completed unsuccessfully.

The items included in the security check displayed on the webpage 300 may be determined based at least in part on the request causing the security check on the webpage 300 to be displayed. The request may be associated with a customer account, may include a request to purchase a particular item, may be associated with a particular browser session, may be associated with a particular browser history or any other information associated with the request. For instance, the items included in the security check displayed on webpage 300 may be based at least in part on information contained in the customer account associated with the particular request that has been redirected to the CAPTCHA service. For example, tablet 302, laptop 312 and bicycle 308 may all be items that the customer has previously caused to be recorded in a saved items list. Using items a customer has previously caused to be recorded or has recently viewed according to the customer navigational history may ensure that the customer has knowledge of the product displayed in the CAPTCHA.

A correct response to the security check may include selecting a price within a particular range where the particular range is within a threshold of the price of the item offered for sale. The price may include a seed value received from a third party such as another retailer or a manufacturer of the item. The price may also be received from a real-time bidding platform responsible for maintaining price information corresponding to prices customers of the real-time bidding platform offer for particular items. The CAPTCHA service may request price information for a particular item from the real-time bidding platform before the security check is generated or after the response to the security check is received. Furthermore, the price information included in the response to the security may be transmitted to the real-time bidding platform and offers to sell the item at the price guessed in the security check may be returned. The offers may be transmitted to the customer as promotional offers for correctly completing the security check.

As shown in FIG. 3 the customer may be presented with a list of prices, the list of prices may be ordered such that the prices are grouped into ranges and the ranges may be separated by one or more non-range prices not in either of the ranges. For example, FIG. 3 shows a first range of prices from one hundred and forty-nine dollars and ninety-nine cents to one hundred and eighty-nine dollars and ninety-nine cents and a second range of prices from two hundred and forty-nine dollars and ninety-nine cents to two hundred and eighty-nine dollars and ninety-nine cents. The first and second ranges are separated by two prices, one hundred and three dollars and twenty-seven cents and twenty-six dollars and seventy-eight cents, not in the first or second range. The security check may be correctly solved by selecting a price in a price range that is within a threshold of the price of the items offered for sale on the electronic marketplace. For example, if the price of the tablet 302 offered for sale on the electronic marketplace is four hundred and seventy-nine dollars, the security check may be correctly solved by selecting a price within fifty dollars of the price of the tablet 302.

The online retailer may configure one or more services or servers such that particular types of requests are redirected to the CAPTCHA service before they are processed, such as purchases above a price threshold or purchases outside of the classifications or categories of the customer's purchase history. The CAPTCHA service may then query one or more other services, such as the product information service, to determine one or more items related to the item the customer is attempting to purchase. For example, if the customer is attempting to purchase a tablet 302, the CAPTCHA service may query the product information service for accessories corresponding to the tablet 302.

The response to the security check may include market data generated by the customer. The market data may include the customer's perceived value of the one or more items displayed in the security check. The market data may be stored by one or more services of the online retailer such as the product information service. The price of one or more items may then be monitored by one or more services of the online retailer and a notification may be sent to the customer when the price of a particular item approaches the price the customer guessed for that particular item. For example, the customer may guess the price of tablet 302 as four hundred and forty-nine dollars and ninety-nine cents during completion of the security check. The product information service may then store this information as market data associated with the customer. The tablet 302 may currently cost five hundred and twenty-five dollars. The price of the tablets 302 may reduce over time or a promotion may be initiated reducing the price of the tablets 302. As the price of the tablet 302 approaches the price guessed by the customer one or more notifications may be transmitted to the customer indicating the price reduction of the tablet 302. A promotional price may be determined by one or more services of the online retailer based at least in part on the price of the tablet 302 and the price guessed by the customer. The promotional price may be offered to the customer in notification. The notification may include e-mail, short message service, notification in the customer's account associated with the online retailer, telephone call, video call, chat message or any other notification suitable for alerting the customer of the price reduction. Furthermore, the notification may be included in one or more targeted advertisements the customer has elected to receive. For example, the customer may elect to receive promotional e-mails corresponding to particular categories of items offered for consumption on the electronic market place. One or more services of the online retailer may determine the price guessed by the customer is within a threshold of the list price of the item offered for sale on the electronic marketplace and may include the item in the promotional e-mail the customer has elected to receive. At least a portion of the targeted advertisement may be pre-generated and the remainder of the items listed in the targeted advertisement may be included based at least in part on information associated with the customer, such as items the customer has guessed a price for or items the customer has expressed an interest in.

The security check displayed in webpage 300 may be pre-generated and stored in one or more storage systems of the online retailer or may be generated upon receipt of the redirected request. The security check may also be partially pre-generated and completed upon receipt of the redirected request. For example, the CAPTCHA service may generate a frame work for the security check including place holders for image of items and text-entry fields where the response to the security check may be entered. Upon receipt of the redirected request the CAPTCHA service may determine, based at least in part on the navigational history associated with the request, the most recently viewed items and include those items in the security check. The CAPTCHA service may determine items to include in the security check based at least in part on information in the customer's account history or the customer's navigational history in combination with other items, such as items that are viewed infrequently or items that have not been viewed by the customer.

Other types of security checks may be used in accordance with the present invention. For example, the security check may require the responder to determine which of the quoted reviews goes to which products. In this instance, the webpage 300 may display the tablet 302, laptop 312 and bicycle 308 and include at least one review of one of the items. The responder may be required to select the review corresponding to each item. Furthermore, the navigational history or information associated with the customer account may indicate one or more reviews the customer has viewed. This may include reviews the customer has commented on, reviews written by the customer, reviews written by one or more other customers included in the customer's list of online friends or any other review associated with the customer account or customer navigational history. Other social media information may be used in the security check such as which of the products have one or more of your online reads recently purchased, discussed, posted about, liked or any other social media interaction containing information corresponding to items displayed in the security check.

Other security checks include asking the responder to review one or more products included in the customer's purchase history. For example, according to information contained in the customer account associated with the redirected request the customer may have recently purchased the tablet 302, laptop 312 and bicycle 308. The CAPTCHA service may request images of the recently purchased items from the product information service and include the images in the security check as well as a prompt instructing the user to enter a review for one or more of the items. The CAPTCHA service or one or more other services of the online retailer may process the review submitted in response to the security check in order to determine if the security check was completed successfully. For example, the review may be processed in order to determine if the review corresponds to the item displayed in the security check and that the review is original. The CAPTCHA service may use one or more machine learning algorithms, such as a naïve Bayes filter, in order to validate the review received in response to the security check. For example, a corpus of reviews may be used as an input into the machine learning algorithm in order to train the machine learning algorithm. The trained machine learning algorithm may then be used to determine if the received review is similar to one or more other reviews for the same item. If the CAPTCHA service determines the review is valid the review may be added to the set of reviews for the item on the electronic marketplace. In various embodiments, the review may be added to the set of reviews for the item but placed in a position of less prominence on the electronic marketplace until one or more customers indicate that the review is helpful.

Figure 4:
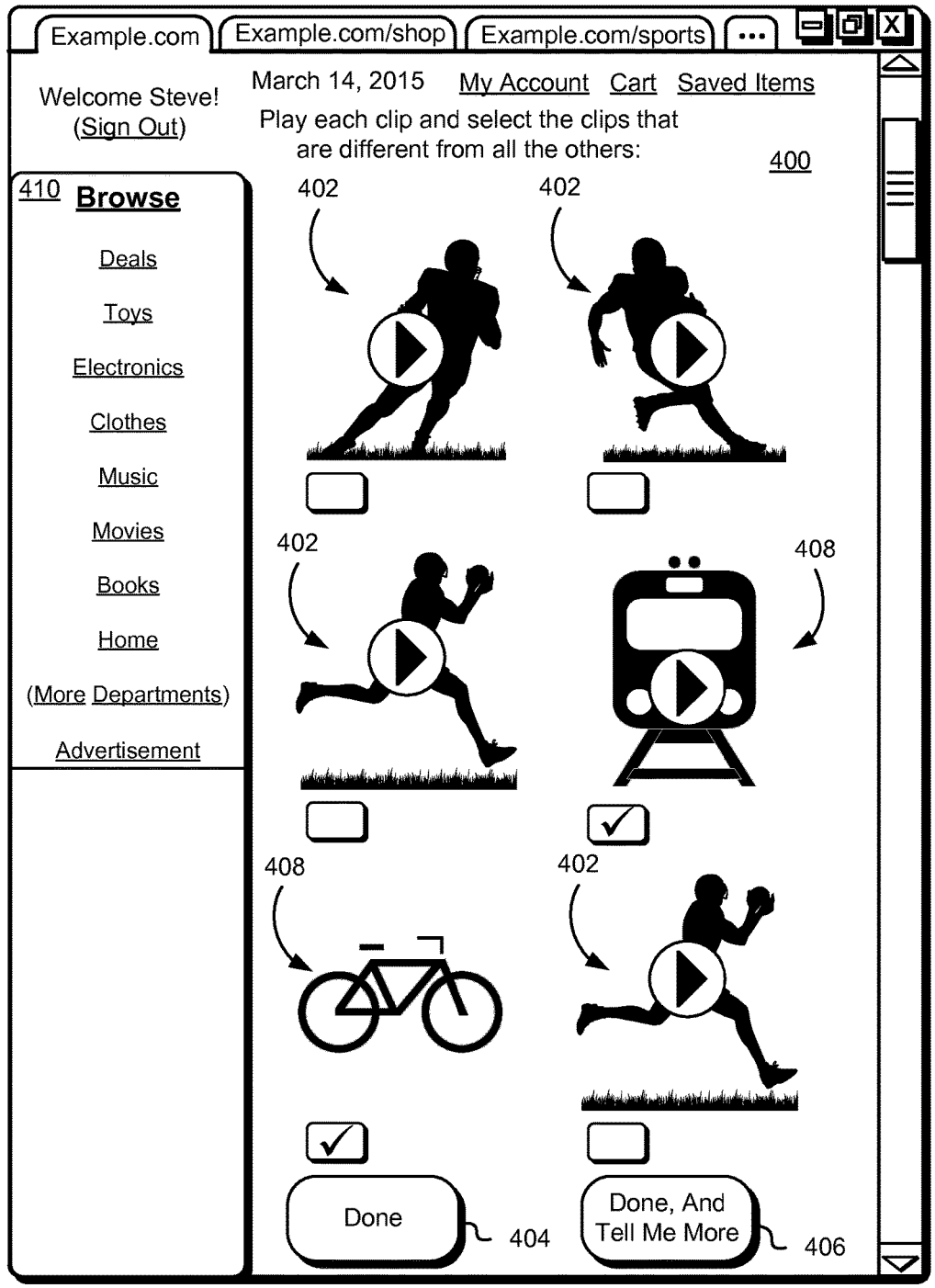
FIG. 4 shows a diagram illustrating a web page in accordance with various aspects of the present disclosure.

FIG. 4 shows an illustration of a webpage 400 including various graphical user interface elements that enable navigation throughout a website of which the webpage 400 is a part. In this example, the webpage 400 is part of an electronic marketplace of an online retailer providing goods and services as well as advertisements and other content. For instance, on the left-hand side of the webpage 400, various links 410 may link to one or more other webpages that contain additional content corresponding to department pages and/or category pages. In this example, the links appear as textual words which enable the links to be selected using an appropriate input device such as a keyboard, mouse, touchscreen or other input device. Selection of one of the links 410 may cause an application displaying the webpage 400 to submit, pursuant to a URL associated with the selected link by the programming of the webpage 400, an HTTP request for the content associated with the link to a server that provided the webpage 400 or another server. In this example, the webpage 400 also includes a graphical user interface element configured as a "done" button 404. The done button 404 may be a graphical user interface element of the webpage 400 where the underlying code of the webpage 400 is configured such that selection by an input device of the done button 404 causes information corresponding to the security check displayed on the webpage 400 to be transmitted to one or more servers of the online retailer.

The webpage 400 may also include a graphical user element configured as a "done and tell me more" button 406. The done and tell me more button 406 may be a graphical user interface element of the webpage 400 where the underlying code of the webpage 400 is configured such that selection by an input device of the done and tell me more button 406 causes information corresponding to the security check displayed on the webpage 400 to be transmitted to one or more servers of the online retailer and causes the application displaying the webpage 400 to navigate to a webpage containing information corresponding to the one or more items displayed in the security check on the webpage 400. In this example, the webpage 400 contains a security check with four video clips requiring the customer to select the video clip that does not match the other three video clips in order to correctly solve the security check. Although video clips are used in this example any type of media may be used in the security check such as audio clips, images or series of images or book passages. Still in accordance with the present disclosure, the done and tell me more button 406 may allow the customer to purchase one or more items included in the security check automatically. For example, the media file 408 may be a movie the customer wishes to purchase. The customer may select a done and purchase the item button, the done and purchase the item button may cause the online retailer to process the purchase request.

The security check may be caused to be displayed on the webpage 400 for a variety of reasons as described above in connection with FIGS. 2A-2B. For example, the bot detection service may cause a request to be redirected to the CAPTCHA service based at least in part on multiple requests from the customer to purchase promotional material, such as free audio or video files, over a period of time. The CAPTCHA service may then generate a security check to be displayed to the customer on the webpage 400. The CAPTCHA service may query one or more other services of the online retailer, such as a media service, for media to be used in the security check displayed on the webpage 400. The media may be selected based at least in part on the purchase history of the customer. For example, the customer's purchase history may indicate the customer has purchased at least one video file. The media service or one or more other services of the online retailer may select one or more media files in the same or similar classification as the video file. In various embodiments, the media service may select the media files based on other information associated with the video file such as director, composer, cast, crew, production company, editor or any other information associated with the video file. The CAPTCHA service may cause the one or more media files 402 to be displayed by the webpage 400 in the security check including at least one media file 408 that does not share the characteristic used by the media service to select the one or more video files. The customer may be required to select the video file that "does not match" (e.g. the media files 408 that do not share the characteristic used by the media service to select the one or more media files). As shown in FIG. 4, the security check may require the customer to select multiple media files 408 that do not match. The customer may select the video file 408 that does not match and the request may be processed or the customer may select to learn more about the one or more video files used in the security check.

The security check displayed on webpage 400 may use other types of media files as well. For example, one or more audio files may be used as well. Furthermore, if more than one audio file is used all or a portion of the audio files may be combined or stitched together such that the audio contained in the audio files is contained in one file. For example, the one or more media files 402 and the media file 408 that does not match the media files 402 may be combined into a single file. In this instance, the webpage 400 may cause the media files 402 and 408 to be played consecutively and the responder may select the portion of the media that does not match. The media files 402 and 408 may be selected based at least in part on the tempo of the audio such that the tempo of each media file 402 and 408 matches. The media may be selected based at least in part on information associated with the customer account or navigational history. Furthermore, the media files may be altered such that the frequency of the audio is shifted but the tempo may remain unchanged.

In another example, the media may be electronic books and the media service may select books based at least in part on electronic books in the customer's library and the classification of the books or author of the books. Based at least in part on the books selected by the media service, the CAPTCHA service may retrieve or cause to be retrieved passages of the books, audio clips corresponding to the passages in the books or any other information corresponding to the selected books suitable for use in a security check. Furthermore, the CAPTCHA service may cause the application displaying the webpage 400 or another application to convert at least a portion of the selected book's text into audio capable of output through one or more output devices connected to a computing device configured to display the webpage 400. For each of the various media files which may be used in connection with the security check described in accordance with the present disclosure, the media service or one or more other services of the online retailer may determine that the customer has opened and consumed at least a portion of the media file used in the security check. For example, if a video or audio clip is used in the security check the media service may determine that the customer has caused, at least the portion of the media file used in the security check, to be played at least once. In another example, the media service may determine that the customer has opened the electronic book used in the security check and has caused at least the passage used in the security check to be displayed.

Figure 5:
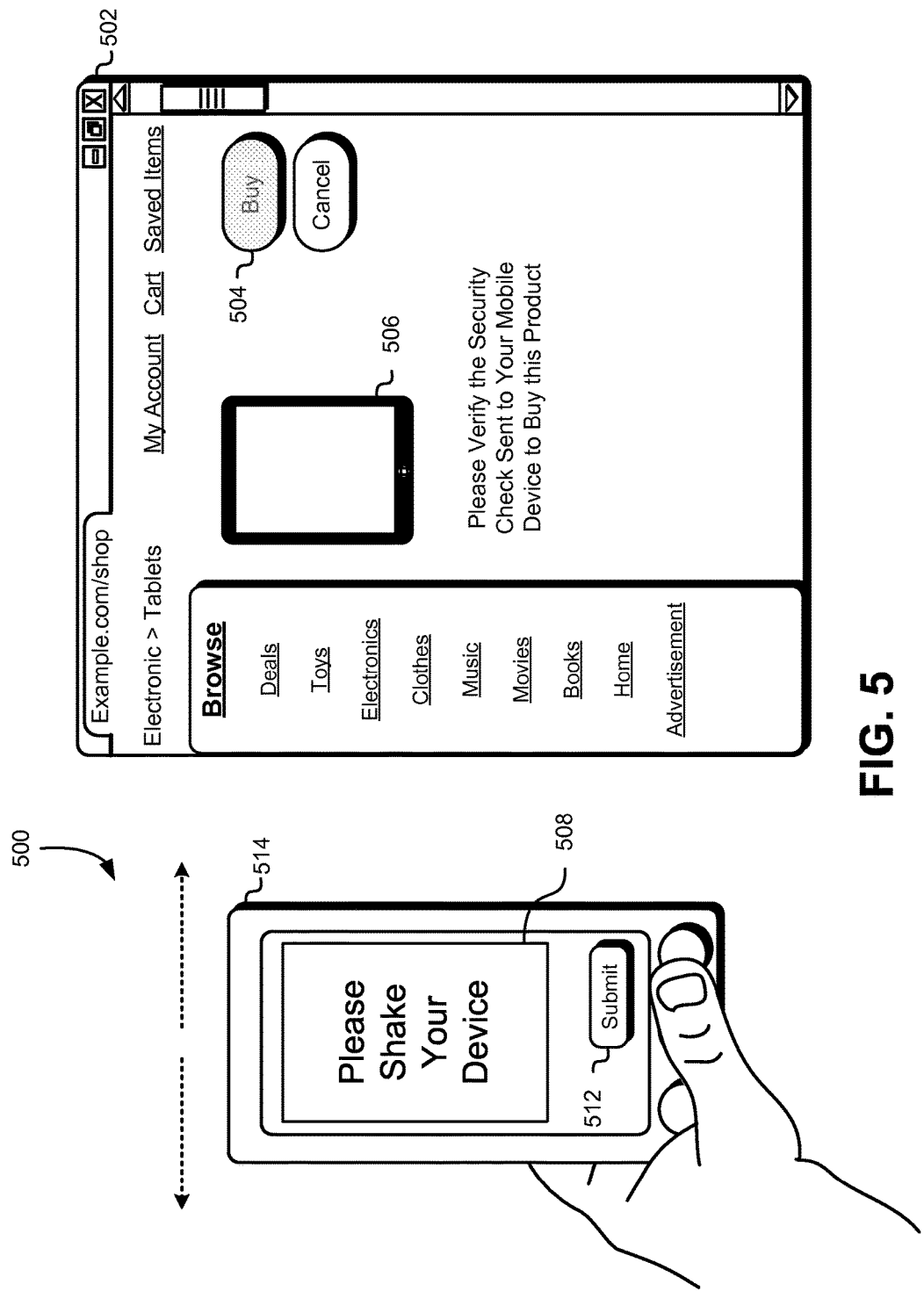
FIG. 5 shows a diagram illustrating two-factor CAPTCHA in accordance with various aspects of the present disclosure.

FIG. 5 shows a diagram 500 illustrating a multi-factor CAPTCHA in accordance with the present disclosure. Accordingly, FIG. 5 shows a webpage 502 which may be part of an electronic marketplace. The webpage 502 may be displayed by a first computing device operated by a customer. The webpage 502 may contain detailed information corresponding to an item 506 for purchase and may also include a graphical user element configured as a "buy" button 504. The buy button 504 may be a graphical user interface element of the webpage 502 where the underlying code of the webpage 502 is configured such that selection by an input device of the buy button 504 completes a purchase transaction for item 506 displayed on the webpage 502. The buy button 504 may be configured such that it is visible on the webpage 502 but not selectable by the customer until a security check 508 is completed. For example, the buy button 504 may be greyed out such that it is visible on the webpage 502 but not useable as a graphical user interface element until the security check 508 is completed successfully. In another example, the buy button 504 may be red and not useable as a graphical user interface element and after successful completion of the security check 508 the buy button 504 is displayed as green and the buy button is useable as a graphical user interface.

In various embodiments, selecting the buy button 504 may cause a security check 508 to be displayed. For example, when the customer selects the buy button 504 it may cause the application displaying the webpage 502 to transmit an HTTP request to one or more servers of the online retailers, the one or more servers of the online retailer may, based at least in part on the HTTP request, redirect the HTTP request to the CAPTCHA service. The CAPTCHA service may generate a security check 508 based at least in part on the HTTP request and a customer account associated with the HTTP request. For example, the customer account may contain information corresponding to a second device 514 configured to receive security checks 508 from the CAPTCHA service for use with the electronic marketplace of the online retailer.

The second device 514 may be configured to receive security checks 508 from the CAPTCHA service or one or more other services of the online retailer and transmit completed security checks to the CAPTCHA service or one or more other services of the online retailer. The second device 514 may also be configured to receive targeted advertisements from the online retailer including advertisements the customer has elected to receive. A variety of different security checks may be used with the second device 514 in accordance with the present invention. The security checks 508 may be implemented as described above in connection with FIGS. 3 and 4. The security check 508 may include a dialog box 510 configured to receive a solution to the security check 508. The customer may complete the security check 508 using one or more devices connected to the second device 514 such as a touchscreen, motion sensor, positioning sensor, camera, keyboard, microphone, infrared sensor, distance sensor or any other device suitable for receiving an input for use with the second device 514. For example, the security check 508 may require the customer to draw a figure on the second device 514 using a touchscreen connected to the second device 514. The security check 508 may also require the customer to shake the second device 514 or shake the second device 514 in a particular pattern.

The second device 514 may contain one or more motion sensors and the security check 508 may require the customer to perform a series of motions. For example, the security check 508 may require the customer to make the sign for a touchdown followed by the touchdown dance of the customer's favorite athlete. The motions may be captured by the one or more motion sensors of second device 514 and transmitted to one or more other services for validation. The security check 508 may require the customer to select from a list of places the customer has been with the second device 514. For example, the CAPTCHA service or one or more other services of the online retailer may determine one or more previous locations the customer has been based at least in part on positioning information captured by the second device such as GPS information, IP address information or radio positioning information.

The customer may complete the security check 508 by entering various inputs into the sensors of the second device. For example, the security check may require the customer to look at a front facing camera on the second device 514, then follow instructions displayed on the screen of the second device 514 such as "look up, look left, roll your eyes." The front facing camera on the second device 514 may record the customer's eye movements and transmit the recorded information to the CAPTCHA service. The security check 508 may also require the customer to take a picture of a particular item in order to complete the security check. For example, information associated with the customer account may indicate that the customer has recently purchased a particular item, the security check may then require the customer to take a picture of the item with one or more cameras connected to the second device 514 and return the picture in response to the security check.

The security check 508 may also cause the second device 514 to display to the customer a puzzle to be solved by interacting with one or more input devices of the second device 514. For example, the puzzle may be a virtual puzzle, such as a three dimensional tile-matching puzzle game, completed using an augmented reality device. After completing the security check the customer may select the "submit" button 512. The submit button may cause the completed security check to be transmitted to the CAPTCHA service or one or more other services or servers. The CAPTCHA service may then determine the request of the security check 508 and cause the request transmitted by the first device to be processed based at least in part on the results of the security check. In accordance with the present disclosure, the second device 514 may display the security check 508 and the security check 508 may require the responder to input the response to the security check 508 on the webpage 502 displayed by the first device. For example, the security check 508 may cause the second device 514 to display images containing one or more characters on an output device connected to the second device. The customer may then enter the characters displayed on the second device 514 into a text-entry field displayed on webpage 502 using one or more input devices connected to the first device.

One or more output devices of the second device 514 may also be used to complete the security check. For example, the security check 508 may contain audio or video files played by one or more output devices connected to the second device 514 such that it may be captured by the first device. One or more sensors of the second device 514 may also generate a unique signature that may be captured by the first device. The information captured by the first device may then be transmitted to the CAPTCHA service or one or more other services of the online retailer to determine if the security check has been completed successfully. Furthermore, the second device 514 or another device may contain an override mechanism configured to verify the customer's humanity without completing the security check. The override may include a security key, smart card, password, authentication device or any other device capable of verifying a customer's identity. For example, the override may include a unique fingerprint associated with the second device 514 based at least in part on the set of sensors connected to the second device 514. In another example, the override may include a key generated by an application executed by the second device 514 and the customer may enter the key into the first device which causes the first device to transmit the key to one or more services of the online retailer. The key may then be authenticated by one or more services of the online retailer and the request may be processed if the key can be authenticated. The key may also be provided to the customer by one or more services of the online retailer in response to a request transmitted from the second device. The CAPTCHA service may allow the customer to use the override in response to particular security checks or limit the frequency the override may be used.

The second device 514 may also be used during payment processing and purchase requests. For example, the customer may register the second device 514 and require a security check 508 to be transmitted to the second device 514 under one or more conditions. The conditions may include any purchase request, purchase requests above a predetermined price, purchase requests outside of the customer's normal purchase habits, purchase requests outside of a particular category, purchase requests for particular goods or services, purchase requests to a previously unknown delivery address or any other condition suitable for transmitting a security check. The CAPTCHA service or one or more other services of the online retailer may then detect a purchase request stratifying one or more of the customer-defined conditions and transmit a security check to the second device 514.

Figure 6:
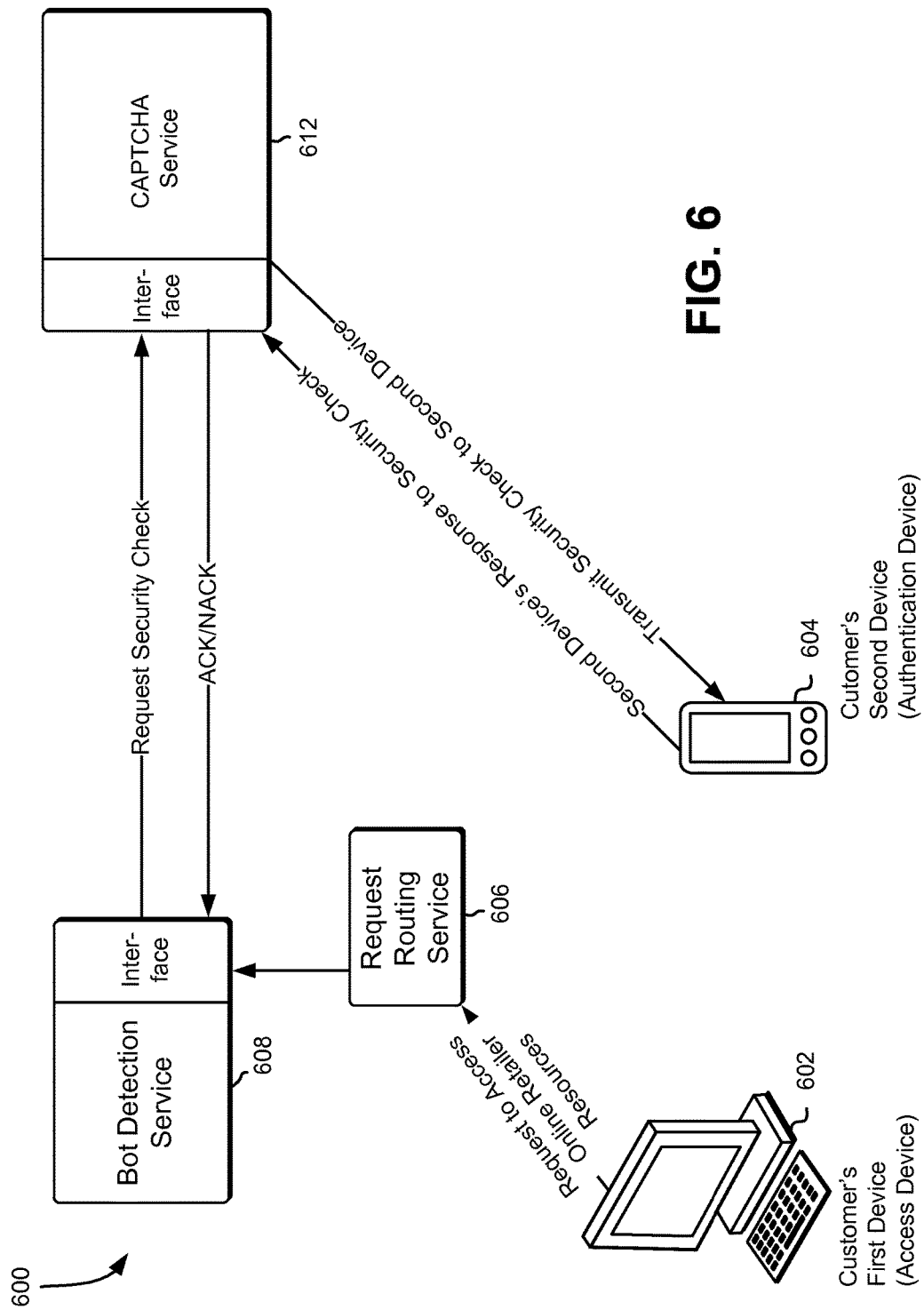
FIG. 6 shows an environment illustrating two-factor CAPTCHA in accordance with various aspects of the present disclosure.

FIG. 6 shows an environment 600 in which a security check is transmitted to a second device 604 to verify the humanity of an operator of a first device 602. The first device 602 and/or the second device 604 may be a point of sale device. For example, the first device 602 may be a terminal and the security check may be transmitted to the second device 604 in response to suspected fraud based at least in part on a request transmitted from the first device 602. The security check may be generated based on any of the techniques described in the present disclosure. In another example, the first device 602 is a magnetic stripe reader or smart card reader connected to a smart phone or other device and the second device 604 may be associated with a merchant responsible for the first device 602. A customer may operate the first device 602 in order to access a website operated by an online retailer. The customer may access the website through a web browser or other application executed by the first device 602, such as the web browser described above in connection with FIG. 5. The first device 602 may transmit one or more requests to the online retailer. The online retailer may operate a request routing service 606 configured to receive customer requests and direct the requests to one or more services or servers of the online retailer for processing. The request routing service 606 may also transmit customer requests to a bot detection service 608.

The bot detection service 608 may determine, based at least in part on the customer request, the likelihood of the customer request being generated by an automated agent, as described above in connection to FIGS. 2A-2B. The bot detection service 608 may receive the request from the request routing service 606 through an interface configured to communicate with one or more other services of the online retailer, such as by transmitting and receiving appropriately configured API requests. An appropriately configured API request may be configured with information sufficient for the request encoded by the API call to be fulfilled by the system receiving the API call and the information provided in the API call is in a format acceptable to the system receiving the call. The bot detection service 608 may request a security check from a CAPTCHA service 612 based at least in part on the probability of the customer request being generated by a bot. The bot detection service may request the security check by redirecting the customer request to the CAPTCHA service 612. The bot detection service 608 may also request the security check by transmitting an appropriately configured API request to the CAPTCHA service 612. Furthermore, the bot detection service 608 may request a particular type of security check or a particular difficulty level for the security check based at least in part on the determined likelihood of the customer request being generated by a bot. For example, if the bot detection service 608 determines that the probability of the customer request being generated by an automated agent is seventy-five percent, the bot detection service 608 may request a security check from the CAPTCHA service 612 that is more difficult than the security check generated when the determined probability of the request being generated by an automated agent is twenty-five percent.

The bot detection service 608 may also request the security check include information corresponding to the customer account associated with the customer request. For example, if the customer is attempting to reset their password, the bot detection service 608 may request a security check from the CAPTCHA service 612 based at least in part on information associated with the customer's account such as browser history, purchase history, liked item list, saved item list or any other information associated with the customer's account. The bot detection service 608 may also simply redirect customer requests suspected of being generated by an automated agent to the CAPTCHA service 612 and the CAPTCHA service 612 may determine what type of security check to transmit in response to the customer request.

The CAPTCHA service 612 may receive the customer request and information associated with the customer request from the bot detection service 608 or one or more other services of the online retailer. The CAPTCHA service 612 may generate based at least in part on the customer request and information associated with the customer request the security check. Generating the security check may include requesting data from one or more other services of the online retailer such as the product information service described above in connection with FIGS. 2A-2B. The CAPTCHA service 612 may then transmit the security check to the second device 604. The second device 604 may be any device registered by the customer through the first device 602 or another device configured to receive security checks from the CAPTCHA service 612. The second device 604 may receive a variety of different security checks such as the security checks described above in connection with FIGS. 3 and 4.

The customer may have access to the second device 604 and may complete the security check transmitted to the second device 604 by the CAPTCHA service 612. The customer may complete the security check using the second device 604 as described in connection with FIG. 5. Once the customer has completed the security check, the second device 604 may transmit the response to the security check to the CAPTCHA service 612 in response to a command from the customer. The CAPTCHA service 612 may receive the response from the second device 604 and determine based at least in part on the response if the security check was completed successfully. The CAPTCHA service 612 may then transmit an acknowledgement or negative acknowledgment to the bot detection service 608 or one or more other services of the online retailer. For example, if the security check was completed successfully, the CAPTCHA service 612 may transmit an acknowledgment to the bot detection service 608 indicating that the security check was completed successfully. The bot detection service may then cause the request to be processed and may also use the acknowledgment to update the bot detection service 608. If a negative acknowledgment is received, the bot detection service 608 may cause the request to be destroyed or otherwise remain unprocessed. Still in accordance with the present disclosure, the CAPTCHA service 612 may not send any acknowledgment and may instead cause the request to be processed or not based at least in part on the response from the second device 604.

Figure 7:
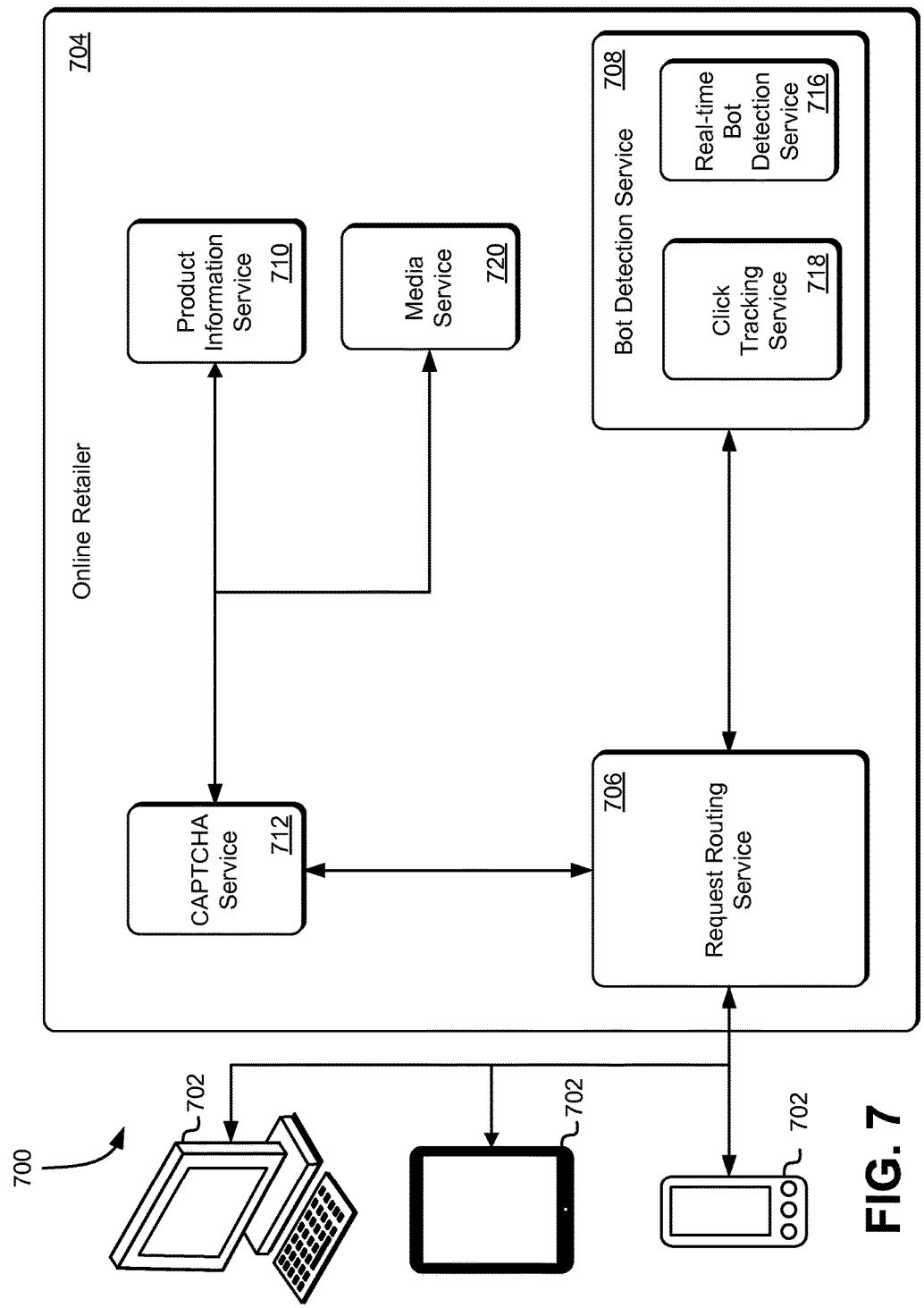
FIG. 7 shows an environment illustrating an online retailer in accordance with various aspects of the present disclosure.

FIG. 7 shows an environment 700 in which customers can connect to an online retailer 704 in order to interact with an electronic marketplace operated by the online retailer 704. Customers can connect to the online retailer 704 through one or more computing devices 702. The computing device 702 may include personal computers, smartphones, tablets or any other computing device capable of connecting to the online retailer 704. The computing device may transmit data over a network to a request routing service 706 operated by the online retailer 704. The request routing service 706 may direct communications (also referred to as requests) from the computing device 702 to the appropriate service of the online retailer 704. For example, the request routing service 706 may direct all password reset requests to a CAPTCHA service 712 for a determination of humanity before allowing the password reset request to be processed by one or more other services of the online retailer 704. The request routing service 706 may also transmit communications received from the computing device 702 to a bot detection service 708. The bot detection service 708 may contain one or more other services to enable detection of communications transmitted by one or more automated agents.

The bot detection service 708 may contain a real-time bot detection service 716 and a click tracking service 718. The real-time bot detection service may be a collection of computing resources collectively configured to calculate a score for one or more requests received from the request routing service 706, where the calculated score correlates to the probability of a particular request being generated by an automated agent. The real-time bot detection service 716 may determine the probability of a communication received from the request routing service 706 being generated by an automated agent near contemporaneously with receipt of the communication. For example, the real-time bot detection service 716 may determine the likelihood of a communication being generated by an automated agent based at least in part on the type of communication transmitted from the computing device 702.

The click tracking service 718 may be a collection of computing resources collectively configured to calculate a score for one or more requests based on a navigational history of the one or more requestors, where the score correlates to the probability of a particular request being generated by an automated agent. The click tracking service 718 may determine the probability of a communication being generated by an automated agent based at least in part on clickstream data. The clickstream data may include data corresponding to input received by one or more input devices such as a mouse or touchscreen and data corresponding to navigation history of the computing devices 702. For example, the click tracking service 718 may determine, based on the computing device 702, navigational history consisting entirely of webpages offering promotional items, that the communication is likely generated by an automated agent.

The real-time bot detection service 716 or the click tracking service 718 may determine the probability of a particular communication being generated by an automated agent and return the probability to the bot detection service 708. The bot detection service 708 may then cause the particular communication to be redirected to the CAPTCHA service 712. The CAPTCHA service 712 may then generate a security check based at least in part on the redirected communication. The CAPTCHA service 712 may request additional information from one or more other services in order to generate the security check. For example, the CAPTCHA service 712 may request product data and/or product price from the product information service 710. The product information service 710 may collect information corresponding to goods or services offered for sale on the electronic marketplace operated by the online retailer 704. The product information service 710 may also store information corresponding to particular goods or services particular customers have viewed on the online marketplace. For example, the product information service 710 may store information corresponding to all the items a particular customer has viewed using computing device 702. The CAPTCHA service 712 may use the information received from the product information service 710 to generate the security check such as the security check described in connection to FIG. 3. The product information service 710 may also maintain information corresponding to the category or classification of goods and services offered for sale on the online market place.

The CAPTCHA service 712 may also request information from the media service 720 for use in the security check. The media service 720 may be a collection of computing resources collectively configured to retrieve one or more media files for use with a security check. The media service 720 may also contain one or more storage systems for storing media files. The media service 720 may retrieve audio and video clips for use in one or more security checks. The media service 720 may also provide the CAPTCHA service 712 with information corresponding to the audio or video clips such as director, composer, genera, duration, performance, performer or any other information corresponding to the audio or video clip. The CAPTCHA service 712 may generate the security check based on the information received from the media service 720 as described above in connection with FIG. 4. Once the security check is generated the CAPTCHA service 712 may transmit the security check to the computing device 702 associated with the communication or a second device registered with the customer account associated with the communication.

The CAPTCHA service 712 or one or more other services of the online retailer 704 may also receive responses to security checks and determine based at least in part on the response if the security check was completed successfully. The request routing service 706 may receive the response to the security check from computing device 702 and direct the response to the security check to the CAPTCHA service 712. The CAPTCHA service 712 may determine if the response satisfies the requirements of the corresponding security check and cause the communication between the computing device 702 and the online retailer 704 to continue.

Figure 8:
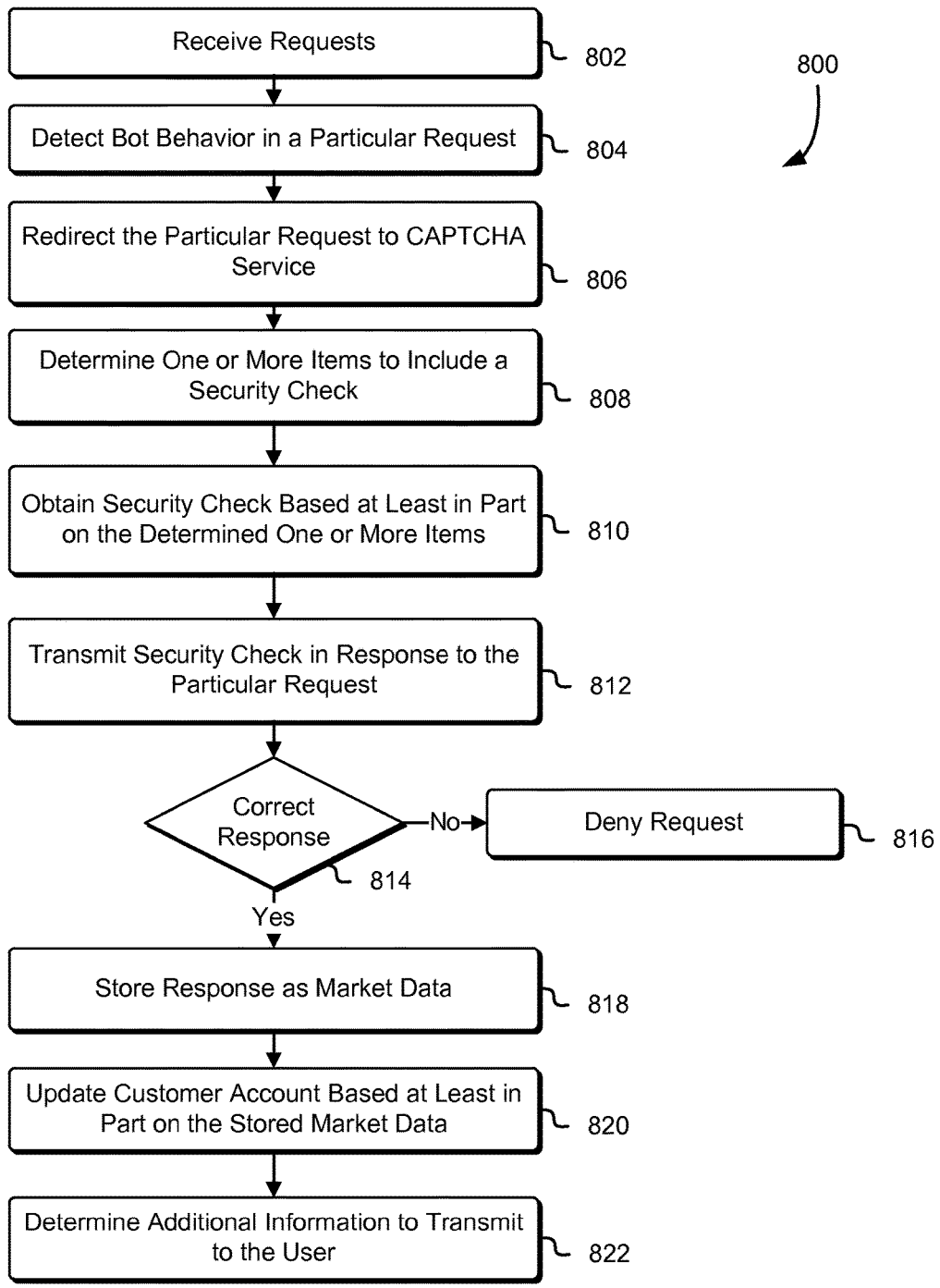
FIG. 8 shows an illustrative example of a process for telling humans and bots apart in accordance with at least one embodiment.

FIG. 8 shows an illustrative example of process 800 which may be used to detect an automated agent and determine the humanity of the operator of a computing device using a security check that includes collecting market data from correctly completed security checks. The process 800 may be performed by any suitable system such as the CAPTCHA service 712, described above in connection to FIG. 7. Returning to FIG. 8, in an embodiment, the process 800 includes receiving one or more requests 802. The requests 802 may be received by a request routing service operated by the online retailers as described above in connection with FIG. 7. The requests may then be streamed to the bot detection service in order to detect automated agent behavior of a particular request 804. The bot detection service or one or more services of the online retailer may calculate a score for each request and determine to redirect the request if the score is beyond a threshold. The score may be based on a statistically significant sample size of the request received by the online retailer. If automated agent behavior is detected, based at least in part on the calculated score, in a particular request 804 the particular request may be redirected to the CAPTCHA service 806. The bot detection service may cause the particular request to be redirected to the CAPTCHA service as described above in connection with FIGS. 2A-2B.

The CAPTCHA service may then determine one or more items to include in the security check 808. For example, the CAPTCHA service may determine items the customer associated with the particular redirected request has recently viewed as indicated by the customer's navigation history. One or more other services of the online retailer may also determine one or more items to include in the security check. For instance, the product information service 710 may contain information corresponding to a saved items list associated with a customer account. The CAPTCHA service may request, from the product information service 710, images of one or more items in the customer's saved items list for use in the security check. The CAPTCHA service may also request other information from one or more other services such as the product information service 710 and the media service as described above in connection with FIG. 7. The other information may include audio or video files associated with the customer account. The CAPTCHA service may then obtain a security check based at least in part on the one or more items 810. The obtained security check may include the security checks described in connection with FIG. 3. The security check may be obtained from one or more storage systems containing one or more security checks. The security check may also be partially or completely generated in response to receiving the redirected request.

The security check may then be transmitted in response to the particular request 812. The CAPTCHA service may cause the security check to be transmitted in response to the request or one or more other services of the online retailer may transmit the security check. Returning to FIG. 8, in an embodiment, the process 800 may receive a response to the security check and determine if the response is correct 814. The CAPTCHA service or one or more other services of the online retailer may receive the response and determine if the response is correct. If the response is not correct the corresponding request may be denied 816. Denying the request may include deleting the request and denying further requests from the same computing device responsible for transmitting the particular request. For example, the request routing service may cause all outstanding copies of the request to be deleted.

The response may include customer guesses corresponding to the price of various items included in the security check and offered for sale on the electronic marketplace operated by the online retailer. This information may then be stored as market data 818 and may be used to update the customer account 820. For example, the security check may be a security check described above in connection with FIG. 3. The customer may return a response including price guesses for one or more items included in the security check. One or more services of the online retailer may determine the returned response is correct based at least in part on the price guesses included in the response being within a threshold of the actual price of the items offered for sale on the electronic commerce website. The data may be stored in the product information service or one or more other services of the online retailer and associated with the customer's account. The updated customer account may then include information indicating the customer perceived value of the one or more items included in the security check. If the price of the one or more items approaches the price stored in the updated customer account a notification may be sent to the customer indicating price information corresponding to the one or more items. Furthermore, a promotion offer may be generated for the customer based at least in part on the updated customer account.

One or more services of the online retailer may determine additional information to transmit to the user 822 in order to process the request. For example, the request routing service may receive from the CAPTCHA service or one or more other services an indication that the response to the security check is correct. The request routing service may cause the request to be directed to the appropriate service responsible for processing the request. The service responsible for processing the request may then determine additional information to transmit to the user 822 in response to the request. For example, the request may include a request for a particular webpage of the electronic commerce website. The request routing service may direct the request to the particular webserver responsible for serving the webpage and cause the webserver to transmit the webpage in response to the request.

Figure 9:
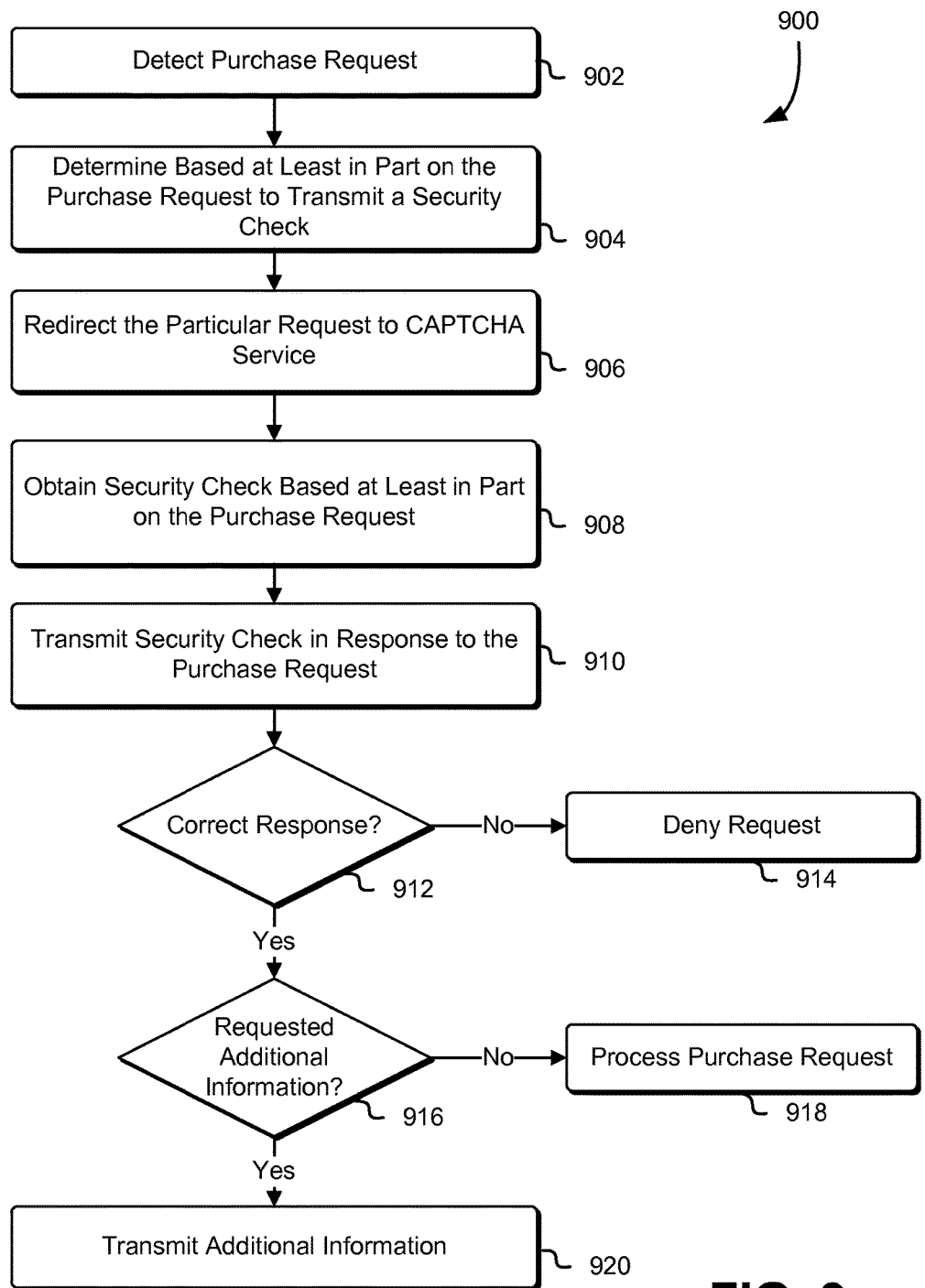
FIG. 9 shows an illustrative example of a process for telling humans and bots apart in accordance with at least one embodiment.

FIG. 9 shows an illustrative example of process 900 which may be used to complete payment processing on an electronic commerce website through the use of a security check. The process 900 may be performed by any suitable system such as the CAPTCHA service 712, described above in connection to FIG. 7. Returning to FIG. 9, in an embodiment, the process 900 includes receiving a purchase request 902. The request may be received by a request routing service operated by the online retailers as described above in connection with FIG. 7. The request routing service or one or more services of the online retailer may determine based at least on the purchase request to transmit a security check 904 in response to the request. The request routing service or one or more services of the online retailer may determine to transmit 904 a security check under a variety of conditions, such as those described above in connection with FIG. 5. For example, one or more services of the online retailer may determine the purchase is outside of the customer's regular purchase patterns. In another example, the customer may define one or more conditions that if met require the online retailer to transmit a security check.

If it is determined that the security check is to be transmitted 904 in response to the purchase request, the purchase request may be redirected to the CAPTCHA service 906. The online proxy service may cause the particular request to be redirected to the CAPTCHA service as described above in connection with FIGS. 2A-2B. The CAPTCHA service may then obtain a security check based at least in part on the purchase request 908. The security check may contain one or more items associated with the customer account as described above in connection with FIG. 3. For example, the security check may include one or more items that the customer has recently written a review for. In another example the security check may include one or more items that the customer has recently liked on a social media site. The CAPTCHA service may request information corresponding to the one or more items included in the security check form, the product information service or the media service as described above in connection with FIG. 8. The CAPTCHA service may, based at least in part on the requested information, obtain a security check such as the security checks described in connection with FIG. 3 and FIG. 4. For example, the CAPTCHA service may obtain one or more images of items and categories associated with the items from the product information service. The CAPTCHA service may then obtain a security check requiring the responder to determine the category for each item.

The CAPTCHA service or one or more other services of the online retailer may transmit the security check in response to the purchase request 908. The CAPTCHA service may cause the security check to be transmitted in response to the request or the CAPTCHA service may transmit the security check to one or more other services of the online retailer responsible for transmitting the security check. Returning to FIG. 9, in an embodiment, the process 900 may receive a response to the security check and determine if the response is correct 912. The CAPTCHA service or one or more other services of the online retailer may receive the response and determine if the response is correct. If the response is not correct the corresponding request may be denied 914. Denying the request may include deleting the request and denying further requests from the same computing device responsible for transmitting the purchase request. If the response is correct, one or more services of the online retailer may determine if additional information 916 was requested in the response to the security check. For example, the response may have been submitted by the customer using the done and tell me more button as described in connection with FIG. 4.

If no additional information is requested, the purchase request may be processed 918. The request routing service may direct the purchase request to the appropriate service in order to complete the purchase. If additional information is requested the request routing service may cause the additional information to be transmitted 920 in response to the customer selecting the done and tell me more button. For example, the purchase request may include a request to purchase a tablet and one or more conditions may require a security check to be transmitted in response to the request. The security check transmitted in response may include one or more accessories to the tablet and in response to the security check the customer may request additional information corresponding to the accessories included in the security check. One or more services of the online retailer may then transmit the additional information 920 to the customer. For example, the customer may receive a webpage with detailed information about the accessories and a navigational feature allowing the customer to purchase one or more of the accessories.

Other variations of process 900 in accordance with the present disclosure may include allowing the customer to purchase one or more of the accessories automatically. For example, the response to the security check may include an indication that the customer requested the purchase of one or more items included in the security check. One or more services of the online retailer may then process the originally submitted purchase request and the purchase request for the one or more items included in the security check. The security check may include items associated with items in the customer's purchase history. For example, the customer may have purchased the first three books in a series of seven books, the security check may include at least one of the other books in the series and allow the customer to complete the originally submitted transaction as well as add at least one item included in the security check to the purchase.

Figure 10:
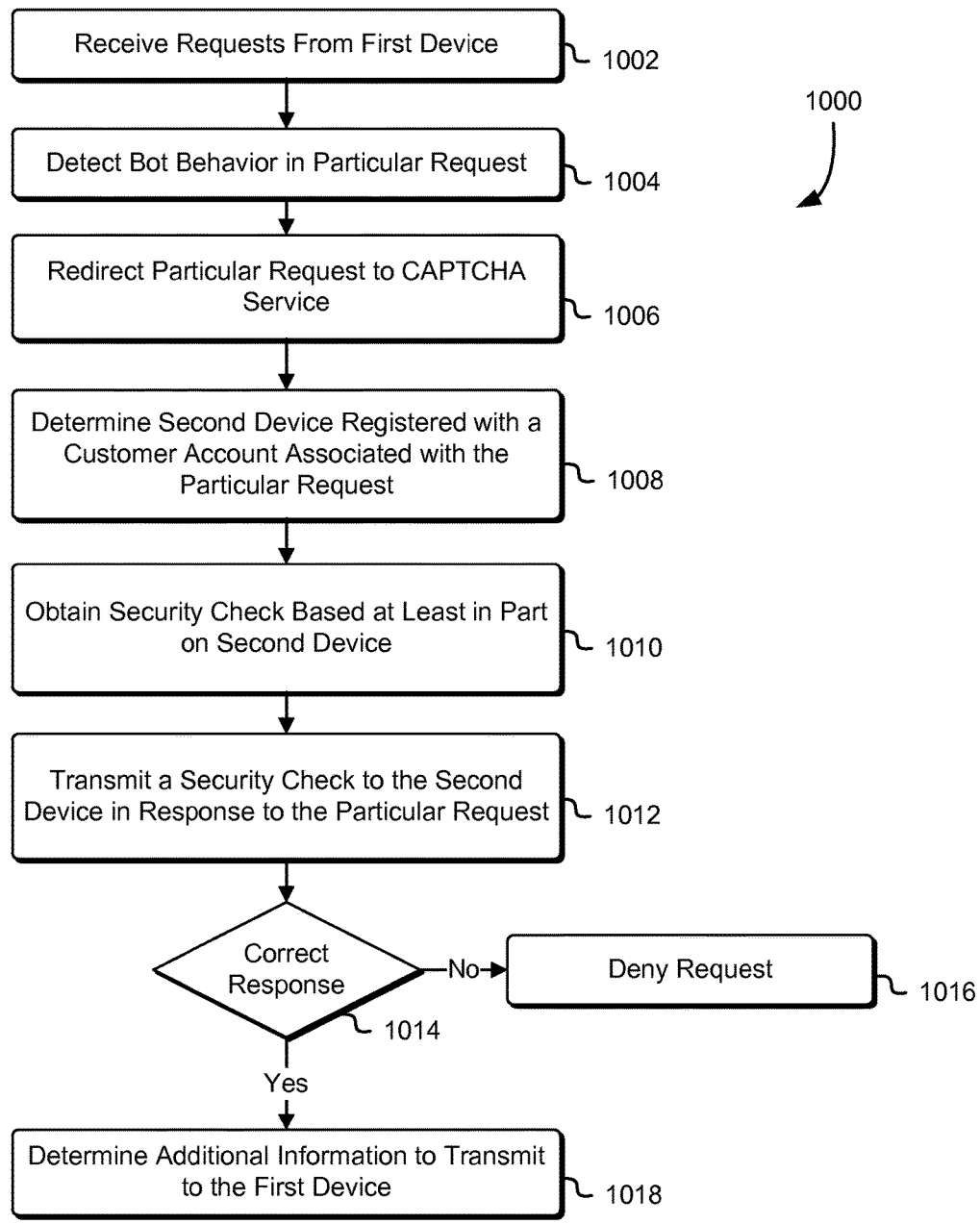
FIG. 10 shows an illustrative example of a process for telling humans and bots apart in accordance with at least one embodiment.

FIG. 10 shows an illustrative example of process 1000 which may be used to detect an automated agent and determine the humanity of the operator of a computing device using a security check that is transmitted to a second device. The process 1000 may be performed by any suitable system such as the CAPTCHA service 712, described above in connection to FIG. 7. Returning to FIG. 10, in an embodiment, the process 1000 includes receiving a request from a first device 1002. The requests may be received by a request routing service operated by the online retailers as described above in connection with FIG. 7. The requests may then be streamed to the bot detection service in order to detect automated agent behavior of a particular request 1004. If automated agent behavior is detected in a particular request 1004 the particular request may be redirected to the CAPTCHA service 1006. The bot detection service may calculate a score for the particular request and cause the particular request to be redirected to the CAPTCHA service 1006 based at least in part on the calculated score.

The CAPTCHA service may then determine a second device register with a customer account associated with the particular request 1008. The previously registered second device may contain one or more sensors as described above in connection with FIG. 5. The CAPTCHA service may determine the second device from among one or more devices registered with the customer account associated with the particular request. For example, the customer may register three devices for use with the CAPTCHA service and the CAPTCHA service or one or more other services of the online retailer may determine which of the registered devices the requestor responsible for generating the particular request would like the security check transmitted to. The CAPTCHA service may also transmit the security check to one or more other registered devices if the CAPTCHA service is unable to transmit the security check to the second device. For example, if the CAPTCHA service is unable to transmit the security check to the second device because the requestor does not have the device or the device is turned off, the CAPTCHA service may determine a third device from the one or more registered devices to transmit the security check to.

In various embodiments, the CAPTCHA service may transmit in response to the particular request one or more graphical user elements that enable selection of a particular device of the one or more devices previously registered with online retailer to send that security check to. The CAPTCHA service may also transmit in response to the particular request one or more graphical user elements that enable selection of a particular type of security check to transmit to the first device. For example, the requestor may not have access to any of the devices previously registered with the online retailer, the CAPTCHA service may allow the requestor to receive a security check on the first device determined to be more difficult than the security check that would have been transmitted to the second device. The CAPTCHA service may also determine if the requestor responsible for generating the particular request has access to the second device by requesting location information from the second device. For example, the CAPTCHA service may request global positioning coordinates from the second device and determine access to the second based at least in part on the requested coordinate and information corresponding to the IP address of the first device.

The CAPTCHA service may obtain a security check based at least in part on the second device 1010. For example, the CAPTCHA service may obtain a security check that utilizes one or more sensors of the second device. The previous register device may have a touchscreen and an accelerometer, the CAPTCHA service may obtain a security check that requires the responder to draw a figure on the touchscreen and shake the device. The second device may have been registered with the CAPTCHA service or one or more other services of the online retailer at some point in time before the particular request is received.

The security check may then be transmitted to the second device in response to the particular request 1010. The second device may be any device as described above in connection with FIG. 5. The CAPTCHA service may cause the security check to be transmitted to the second device in response to the request. Returning to FIG. 10, in an embodiment, the process 1000 may receive a response to the security check from the second device and determine if the response is correct 1012. The CAPTCHA service or one or more other services of the online retailer may receive the response and determine if the response is correct. If the response is not correct the corresponding request may be denied 1016. Denying the request may include deleting the request and denying further requests from the same computing device responsible for transmitting the particular request. The request routing service may be responsible for denying further requests based at least in part on information associated with the request such as an IP address included in the request. If the response is correct one or more services of the online retailer may determine additional information to transmit to the user 1018 in order to process the request. For example, the request routing service may receive a determination from the CAPTCHA service that the response is correct and may direct the request to one or more services responsible for processing the request.

Other variations of process 1000 in accordance with the present disclosure may include transmitting additional information to the second device and requiring the customer to input the additional information received by the second device into the first device before the request may be processed. For example, a security code may be transmitted to the second device in response to a correctly solved security check and the online retailer may require the code to be entered into a webpage displayed on the first device before the request may be processed. In another variation, an override may be used in response to the security check. For example, the second device may include an authentication application configured to generate an authenticated security code that the customer may enter into the first device bypassing the security check transmitted to the second device. Furthermore, a correct response 1014 may cause additional information to be transmitted to the second device instead of or in combination with the first device.

Figure 11:
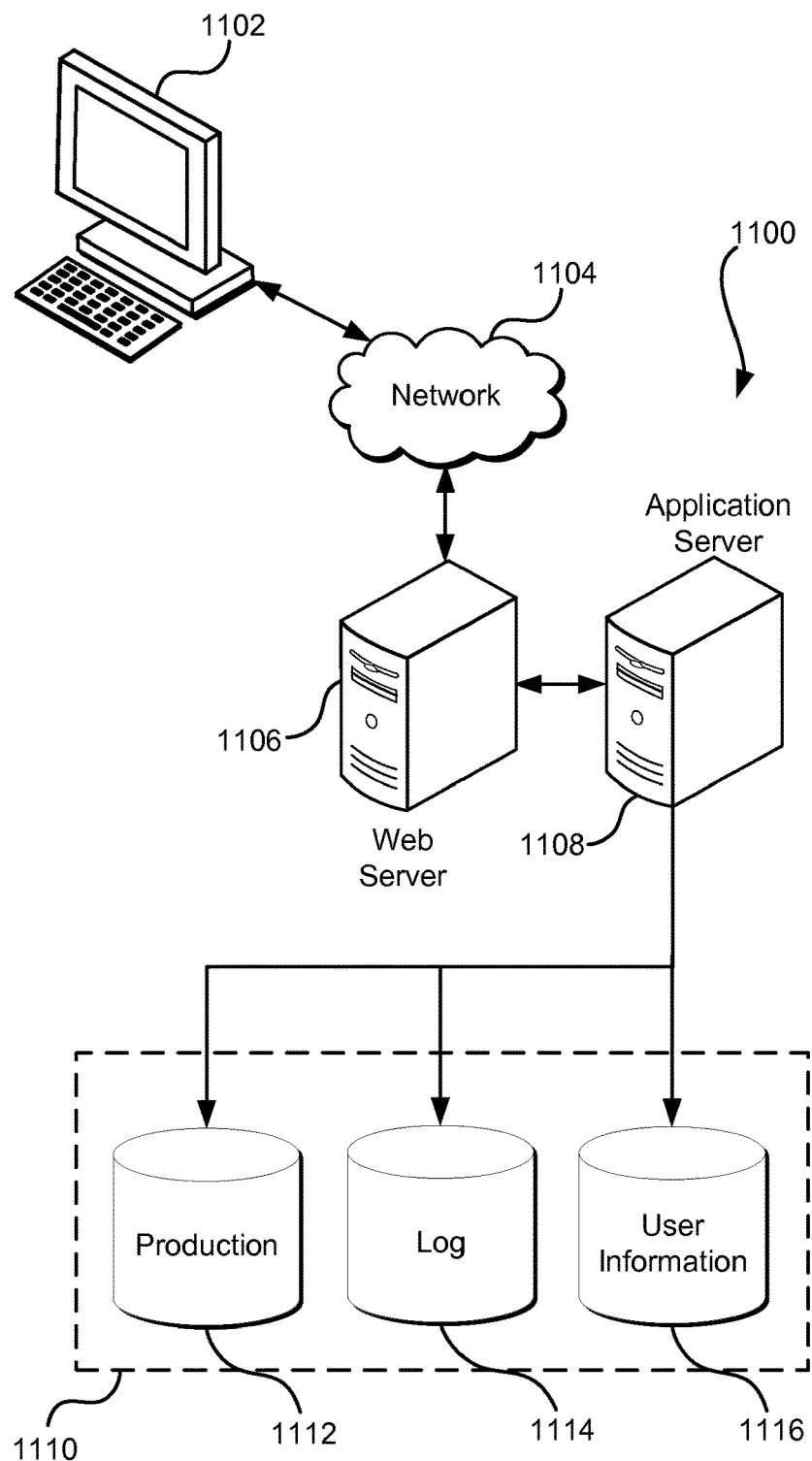
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug 'n Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

Embodiments of the disclosure can be described in view of the following clauses:

1. A computer-implemented method for telling computers and humans apart, comprising:
   under the control of one or more computer systems configured with executable instructions,
   receiving, over a network, one or more requests to access one or more resources associated with an online retailer;
   calculating a score for a particular request of the one or more requests, where the score corresponds to a probability of the particular request having been generated by an automated agent behavior;
   redirecting the particular request to a CAPTCHA service based at least in part on the calculated score for the particular request, where the calculated score is compared to a threshold value and the particular request is redirected if the calculated score is equal to or greater than the threshold value;
   obtaining, based at least in part on a list price corresponding to one or more items offered for consumption, a security check containing a presentation of the one or more items and code for one or more user interface components that enable user specification of a guessed price for individual ones of the one or more items;
   transmitting the security check in response to the particular request of the one or more requests;
   receiving a response to the security check including one or more guessed prices for the one or more items;
   determining whether to allow access to the resource based at least in part on the received response;
   if the access is allowed, storing the one or more guessed prices for the one or more items received in the response to the security check;
   determine a promotional price based at least in part on the list price corresponding to one or more and the stored one or more guessed prices for the one or more items; and
   providing the promotional price to a customer associated with at least a portion of the stored one or more guessed prices for the one or more items.

2. The computer-implemented method of clause 1, wherein obtaining the security check containing the presentation of the one or more items includes selecting the one or more items for the presentation based at least in part on history information of a customer account associated with the particular request.

3. The computer-implemented method of any one of the preceding clauses, wherein the computer implemented method further includes transmitting a notification to a customer associated with the particular request when the list price corresponding to the one or more items offered for consumption changes to be within a predetermined amount of the corresponding stored one or more guessed prices for the one or more items.

4. The computer-implemented method of any one of the preceding clauses, wherein:
transmitting the security check in response to the particular request of the one or more requests includes an indication that successfully completing the security check will enable access to a promotional offer; and
if the received response indicates successful completion of the security check, enabling an item to be consumed in accordance with the promotional offer.

5. The computer-implemented method of any one of the preceding clauses, wherein transmitting the security check in response to the particular request of the one or more requests includes transmitting the security check to a second device registered with a user account associated with the particular request.

6. The computer-implemented method of any one of the preceding clauses, wherein redirecting the particular request includes determining a type of request of the particular request and redirecting the particular request based at least in part on the type of request.

7. A system, comprising at least one computing device configured to implement one or more services, wherein the one or more services are configured to:
cause a security check to be transmitted, where the security check is based at least in part on price data corresponding to one or more items and includes a presentation of the one or more items;
determine, in response to receiving a response to the security check, where the response includes market data generated in response to the security check, whether to allow access to the resource based at least in part on the received response; and
cause to be stored the market data included in the response to the security check.

8. The system of clause 7, wherein the at least one computing device is further configured to:
monitor price data corresponding to the one or more items; and
transmit a notification indicating price data corresponding to the one or more items has changed such that price data is within a predetermined amount of the market data.

9. The system of clause 7 or 8, wherein the security check further includes providing a promotional price for one or more of the items.

10. The system of any one of the clauses 7 to 9, wherein the at least one computing device is further configured to select the one or more items based at least in part on accessories for an item purchased by a customer associated with the at least one request to include in the security check.

11. The system of any one of the clauses 7 to 10, wherein the at least one computing device is further configured to transmit, in response to the at least one request, information corresponding to the one or more items.

12. The system of any one of the clauses 7 to 11, wherein the presentation of the one or more items includes clips of audio or video files offered for sale by an online retailer.

13. The system of any one of the clauses 7 to 12, wherein the one or more items include passages from electronic books where the electronic books are associated with a customer account associated with the at least one request.

14. A non-transitory computer-readable storage medium having stored thereon executable instructions that, when executed by one or more processors of a computer system, cause the computer system to at least:
provide a security check that is required to be completed to gain particular access to a computer system, the security check comprising:
one or more images of items offered for consumption by an online retailer; and
at least one user interface element configured to allow a customer to specify a price corresponding to a subset of the one or more images; and
store, in response to receiving a customer-specified price obtained as a result of completion of the security check, the customer-specified price.

15. The non-transitory computer-readable storage medium of clause 14, wherein the instructions further comprise instructions that, when executed by the one or more processors, cause the computer system to select the one or more images of items offered for consumption by an online retailer based at least in part on a navigational history of a customer associated with the security check.

16. The non-transitory computer-readable storage medium of clause 14 or 15, wherein the instructions further comprise instructions that, when executed by the one or more processors, cause the computer system to select the one or more images of items offered for consumption by an online retailer based at least in part on a purchase history of a customer associated with the security check where the one or more images represent accessories for one or more purchases included in the purchase history.

17. The non-transitory computer-readable storage medium of any one of the clauses 14 to 16, wherein the instructions further comprise instructions that, when executed by the one or more processors, cause the computer system to notify a customer associated with the security based at least in part on the customer-specified price corresponding to the subset of the one or more images.

18. The non-transitory computer-readable storage medium of any one of the clauses 14 to 17, wherein:
the instructions that cause the computer system to generate the security check further include instructions that cause the computer system to offer a promotional value to a customer associated with the security for successfully completing the security check; and
if the security check is completed successfully, enabling a second item to be consumed in accordance with the promotional value.

19. The non-transitory computer-readable storage medium of any one of the clauses 14 to 18, wherein the instructions further comprise instructions that, when executed by the one or more processors, cause the computer system to select the one or more images of items offered for consumption by an online retailer retrieve such that the one or more images represent advertisements associated with the items offered for consumption.

20. The non-transitory computer-readable storage medium of any one of the clauses 14 to 19, wherein the instructions further comprise instructions that, when executed by the one or more processors, cause the computer system to transmit to a customer associated with the security check, information corresponding to the items offered for consumption represented by the one or more images.

21. The non-transitory computer-readable storage medium of any one of the clauses 14 to 20, wherein the instructions further comprise instructions that, when executed by the one or more processors, cause the computer system to alter the one or more images of items offered for consumption included in the security check such that the altered one or more images are computationally distinct from the one or more images and usable for visually representing the items offered for consumption corresponding to the one or more images.

22. A computer-implemented method for telling humans and bots apart, comprising:
under the control of one or more computer systems configured with executable instructions,
receiving, over a network, one or more requests to access one or more resources associated with an online retailer;
calculating a score for a particular request of the one or more requests, where the score corresponds to a probability of the particular request having been generated by an automated agent behavior;
redirecting the particular request to a CAPTCHA service based at least in part on the calculated score for the particular request, where the calculated score is compared to a threshold value and the particular request is redirected if the calculated score is equal to or greater than the threshold value;
generating the security check based at least in part the user and the user account associated with the request, where the security check is configured to distinguish human operators from automated agents;
identifying, based at least in part on the user account associated with the particular request, a second device of the one or more devices;
transmitting the security check to the second device;
receiving the response to the security check from the second device; and
determining whether to allow access to the resource based at least in part on the received response.

23. The computer-implemented method of clause 22, wherein the computer-implemented method further includes:
identifying, based at least in part on the user account associated with the particular request, a third device of the one or more devices, the third device having been configured to differentiate human operators from automated agents; and
transmitting the security check to the third device.

24. The computer-implemented method of clause 22 or 23, wherein the response to the security check includes non-textual data generated based at least in part on one or more sensors of the device.

25. The computer-implemented method of any one of the clauses 22 to 24, wherein the response to the security check from the second device includes an override to the security check configured to verify the user such that the requested access to the resources is allowed without requiring the security check to be completed successfully.

26. The computer-implemented method of any one of the clauses 22 to 25, wherein the computer-implemented method further includes storing the response to the security check as market data associated with the user account.

27. The computer-implemented method of any one of the clauses 22 to 26, wherein generating the security check includes generating the security check based at least in part on the identified second device such that the response to the security check utilizes an image capture device connected to the second device to capture movements of the user.

28. A system, comprising at least one computing device configured to implement one or more services, wherein the one or more services are configured to:
generate a security check configured to differentiate a human from the automated agent in response to receiving a request from a first device;
identify at least a second device configured to receive the security check;
transmit to the second device the security check; and
determine, in response to receiving from the second device a response to the security check, to fulfill the at least one request based at least in part on the response to the security check.

29. The system of clause 28, wherein receiving the response to the security check includes receiving non-alphanumeric data generated based at least in part on one or more sensors of the second device.

30. The system of clause 28 or 29, wherein the at least one computing device is further configured to:
output, in response to the security check, data from one or more output devices connected to the second device;
capture the outputted data by a first device responsible for transmitting the at least one request; and
transmit the captured output data to the online retailer.

31. The system of any one of the clauses 28 to 30, wherein the at least one computing device is further configured to fulfill the at least one request such that the requested access to the one or more resources included in the at least one request is enabled without requiring a customer to submit another request.

32. The system of any one of the clauses 28 to 31, wherein generating the security check includes generating a particular type of security check based at least in part on one or more capabilities of the identified second device.

33. The system of any one of the clauses 28 to 32, wherein the security check specifies a figure a customer is to draw using one or more input devices connected to the second device in order to complete the security check.

34. The system of any one of the clauses 28 to 33, wherein the at least one computing device is further configured to:
determine a purchase history based at least in part on a customer account; and
cause a second request to be directed to the security service based at least in part on the second request being a purchase request for an item in a category not included in the purchase history.

35. A non-transitory computer-readable storage medium having collectively stored thereon executable instructions that, when executed by one or more processors of a computer system, cause the computer system to at least:

identify, based at least in part on a request, from a first device, to access one or more resources, a second device configured to receive a security check, where the security check is configured to verify the request was generated by a human operator;

transmit the security check to the second device;

cause, in response to receiving from the second device, a response to the security check, the response to be persistently stored; and allow the requested access to the one or more resources based at least in part on the response to the security check.

36. The non-transitory computer-readable storage medium of clause 35, wherein the instructions further comprise instructions that, when executed by the one or more processors, cause the computer system to transmit the requested one or more resources to the second device.

37. The non-transitory computer-readable storage medium of clause 35 or 36, wherein the instructions further comprise instructions that, when executed by the one or more processors, cause the computer system to redirect the request to a security service based at least in part on a calculated score of the request, where the score corresponds to the probability of the request being generated by an automated agent.

38. The non-transitory computer-readable storage medium of any one of the clauses 35 to 37, wherein the instructions further comprise instructions that, when executed by the one or more processors, cause the computer system to redirect the request to a security service based at least in part on one or more conditions, defined by a customer, indicating that the request should be redirected to the security service.

39. The non-transitory computer-readable storage medium of any one of the clauses 35 to 38, wherein the instructions further comprise instructions that, when executed by the one or more processors, cause the computer system to generate the security check such that the security check prompts an operator of the second device to shake the second device in order to be complete the security check.

40. The non-transitory computer-readable storage medium of any one of the clauses 35 to 39, wherein the instructions further comprise instructions that, when executed by the one or more processors, cause the computer system to generate the security check such that the security check requires non-textual data generated based at least in part on one or more sensors of the second device.

41. The non-transitory computer-readable storage medium of any one of the clauses 35 to 40, wherein the instructions that cause the computer system to receive the response to the security check further include instructions that cause the computer system to receive an override to the security check such that the override enables the requested access to the one or more resources without receiving the response to the security check.

42. A computer-implemented method for distinguishing humans from automated agents, comprising:

under the control of one or more computer systems configured with executable instructions, receiving, from one or more devices over a network, one or more requests to consume one or more items offered for consumption in an electronic marketplace operated by an online retailer where the one or more requests to consume are associated with one or more customer accounts;

selecting, based at least in part on a particular request to consume one or more items and a particular customer account associated with the particular request, one or more other items;

generating a security check configured to distinguish human operators from automated agents based at least in part on the one or more other items;

transmitting the security check in response to the particular request to consume one or more items;

receiving a response to the security check; and processing the particular request to consume one or more items based at least in part on the response to the security check.

43. The computer-implemented method of clause 42, wherein the method further includes:

selecting one or more accessories corresponding to the one or more items included in the particular request to consume one or more items; and generating the security check based at least in part on the one or more accessories.

44. The computer-implemented method of clauses 42 or 43, wherein processing the particular request to consume one or more items includes causing information to be displayed corresponding the one or more accessories based at least in part on the response to the security check.

45. The computer-implemented method of any one of the clauses 42 to 44, wherein generating the security check based at least in part on the one or more accessories includes generating code for one or more user interface components that enable user specification of market data corresponding to at least a subset of the one or more accessories.

46. The computer-implemented method of any one of the clauses 42 to 45, wherein:

transmitting the security check in response to the particular request to consume one or more items includes transmitting an indication that successfully completing the security check will enable access to a promotional offer; and if the received response to the security check indicates successful completion of the security check, the method further comprises enabling an item to be consumed in accordance with the promotional offer.

47. The computer-implemented method of any one of the clauses 42 to 46, wherein transmitting the security check in response to the particular request to consume one or more items includes determining a second device registered with a particular customer account of the one or more customer accounts and transmitting the security check to the second device.

48. A system, comprising at least one computing device configured to implement one or more services, wherein the one or more services are configured to:

determine, in response to receiving, over a network, a request, associated with a customer account, to consume an item offered for consumption on an electronic commerce marketplace, one or more other items based at least in part on the customer account and the item;

generate a security check configured to differentiate humans from automated agents;

cause the security check to be transmitted in response to the request;
determine the request was generated by a human operator based at least in part on a response to the security check; and
process the request based at least in part on the determination that the request was generated by the human operator.

49. The system of clause 48, wherein generating the security check includes obtaining code for one or more user interface components that enable user specification of a review of a previously consumed item based at least in part on information contained in the customer account.

50. The system of clause 48 or 49, wherein determining one or more other items includes selecting items based at least in part on a navigational history associated with the customer account.

51. The system of any one of the clauses 48 to 50, wherein the at least one computing device is further configured to:
transmitting the security check in response the request includes an indication that consuming at least one of the one or more other items enable access to a promotional offer; and
if the received response to the security check indicates consumption of the at least one other item, the system further comprises enabling the at least one other item to be consumed in accordance with the promotional offer.

52. The system of any one of the clauses 48 to 51, wherein;
generating the security check includes providing, in the security check, a user interface element configured to enable to the use to transmit a command for more information corresponding to the one or more other items; and
providing the information corresponding to the one or more other items in response to the command.

53. The system of any one of the clauses 48 to 52, wherein the at least one computing device is further configured to process the request automatically in response to the determination that the request was generated by the human operator.

54. The system of any one of the clauses 48 to 53, wherein the at least one computing device is further configured to:
select one or more media clips of one or more media files associated with the customer account; and
generate the security check such that the security check contains a presentation of the one or more video clips.

55. A non-transitory computer-readable storage medium having collectively stored thereon executable instructions that, when executed by one or more processors of a computer system, cause the computer system to at least:
generate, in response to receiving, over a network, a request to access a resource, a security check configured to distinguish a human operator from an automated agent based at least in part on the item;
transmit the security check in response to the request; and
enable, in response to receiving a response to the security check, access to the resource as a result of the response to the security check indicating the request having been transmitted pursuant to input of a human operator.

56. The non-transitory computer-readable storage medium of clause 55, wherein the instructions further comprise instructions that, when executed by the one or more processors, cause the computer system to:
identify a second device associated with the request; and
transmit the security check to the second device in response to the request.

57. The non-transitory computer-readable storage medium of clause 55 or 56, wherein the instructions further comprise instructions that, when executed by the one or more processors, cause the computer system to:
receive an override to the security check in response to the security check; and
process the request based at least in part on the override.

58. The non-transitory computer-readable storage medium of any one of the clauses 55 to 57, wherein the instructions that cause the computer system to transmit the security check in response to the request further include instructions that cause the computer system to:
transmit an indication that successful completion of the security check will enable access to one or more promotional offers; and
if the received response to the security check indicates successful completion of the security check, the non-transitory computer-readable storage medium further comprises enabling access to the one or more promotional offers.

59. The non-transitory computer-readable storage medium of any one of the clauses 55 to 58, wherein the instructions that cause the computer system to generate the security check further include instructions that cause the computer system to generate the security check based at least in part on one or more media files associated with a customer account associated with the request.

60. The non-transitory computer-readable storage medium of any one of the clauses 55 to 59, wherein the instructions further comprise instructions that, when executed by the one or more processors, cause the computer system to:
transmit in response to the request code for one or more user interface components that enable a user to specify information corresponding to a type of security check;
receive information corresponding to the type of security check; and
generate the security check based at least in part on the received information.

61. The non-transitory computer-readable storage medium of any one of the clauses 55 to 60, wherein the instructions that cause the computer system to generate the security check further include instructions that cause the computer system to:
provide, in the security check, a user interface element configured to enable a user to transmit a command to consume one or more items; and
enable the one or more items to be consumed by the user in response to the command.

All references, including publications, patent applications and patents, cited herein are hereby incorporated by reference to the same extent as if each reference were individually and specifically indicated to be incorporated by reference and were set forth in its entirety herein.

What is claimed is:
1. A computer-implemented method comprising:
receiving, over a network, a request to access a resource associated with an online retailer, the request associated with a purchase of a first item;

obtaining, based at least in part on a list price of a second item, a security check containing a presentation of the second item and code for one or more user interface components that enable user specification of a guessed price for the second item, the second item unassociated with the purchase of the first item, wherein the security check enables both detection of an automated agent and collection of market data related to the second item;

transmitting the security check in response to the request;

receiving a response to the security check including a guessed price for the second item;

determining to allow access to the resource based at least in part on the received response; and storing the guessed price for the second item.

2. The computer-implemented method of claim 1, wherein obtaining the security check includes selecting the second item for presentation based at least in part on history information of a client account associated with the request.

3. The computer-implemented method of claim 1, wherein the computer implemented method further includes providing a notification to the client associated with the request that the list price of the second item has changed to fall within a predetermined amount of the guessed price of the second item.

4. The computer-implemented method of claim 1, wherein:

transmitting the security check includes providing an indication that successfully completing the security check will enable access to a promotional offer; and upon successful completion of the security check, enabling an item to be consumed in accordance with the promotional offer.

5. The computer-implemented method of claim 1, wherein transmitting the security check includes transmitting the security check to a second device registered with a user account associated with the request.

6. The computer-implemented method of claim 1, wherein receiving the request includes determining a type of request of the request and transmitting the security check based at least in part on the type of request.

7. The computer-implemented method of claim 1, wherein a promotional price for the second item is provided to a customer associated with at least a portion of a plurality of guessed prices for the second item, the promotional price of the second item being determined at least in part from the plurality of guessed prices for the second item and the list price of the second item, at least one of the plurality of guessed prices for the second item being obtained from at least one other customer, the plurality of guessed prices for the second item and the list price of the second item comprising market data for each of the one or more items.

8. A system, comprising at least one computing device that implements one or more services, wherein the one or more services:

in response to a request to purchase a first item, cause a security check to be transmitted, where the security check is based at least in part on price data corresponding to a second item, the second item unrelated to the purchase of the first item, and enables both detection of an automated agent and collection of market data related to the second item;

in response to receiving a response to the security check, determine to allow access to the resource based at least in part on the received response; and cause to be stored the market data included in the response to the security check.

9. The system of claim 8, wherein the at least one computing device further implements:

monitor price data corresponding to the second item; and transmit a notification indicating that price data for the second item has changed such that the price data is within a predetermined amount of the market data related to the second item.

10. The system of claim 8, wherein the security check further includes providing a promotional price for the second item.

11. The system of claim 8, wherein the at least one computing device further implements presenting the second item based at least in part on accessories for an item purchased by a customer associated with the request to include in the security check.

12. The system of claim 8, wherein the at least one computing device further implements transmitting, in response to the request, information corresponding to the second item.

13. The system of claim 8, wherein the security check includes clips of audio or video files.

14. The system of claim 8, wherein the security check includes passages from electronic books where the electronic books are associated with a customer account associated with the purchase of the first item.

15. A non-transitory computer-readable storage medium having stored thereon executable instructions that, when executed by one or more processors of a computer system, cause the computer system to at least:

provide a security check, in association with a purchase of a first item, whose completion enables both detection of an automated agent and collection of market data related to a second item, the second item being unrelated to the purchase of the first item, the security check being required to be completed to gain access to a computer system, the security check comprising:

an image of the second item;

at least one user interface element enabling a customer to specify a price corresponding to the second item; and in response to receiving a customer-specified price obtained as a result of completion of the security check:

store the customer-specified price; and provide a response to the security check.

16. The non-transitory computer-readable storage medium of claim 15, wherein the instructions further comprise instructions that, when executed by the one or more processors, cause the computer system to select the image of the second item based at least in part on a navigational history of a customer associated with the security check.

17. The non-transitory computer-readable storage medium of claim 15, wherein the instructions further comprise instructions that, when executed by the one or more processors, cause the computer system to select the image of the second item based at least in part on a purchase history of a customer associated with the security check where the one or more images represent accessories for one or more purchases included in the purchase history.

18. The non-transitory computer-readable storage medium of claim 15, wherein the instructions further comprise instructions that, when executed by the one or more processors, cause the computer system to notify a customer associated with the security check based at least in part on the customer-specified price of the item.

19. The non-transitory computer-readable storage medium of claim 15, wherein:
   the instructions that cause the computer system to generate the security check further include instructions that cause the computer system to offer a promotional price to a customer associated with the security check; and
   upon successful completion of the security check, enable a third item to be consumed in accordance with the promotional price.

20. The non-transitory computer-readable storage medium of claim 15, wherein the instructions further comprise instructions that, when executed by the one or more processors, cause the computer system to select the image of the second item such that the image represents an advertisement associated with the second item.

21. The non-transitory computer-readable storage medium of claim 15, wherein the instructions further comprise instructions that, when executed by the one or more processors, cause the computer system to transmit to a customer associated with the security check, information corresponding to the second item.

22. The non-transitory computer-readable storage medium of claim 15, wherein the instructions further comprise instructions that, when executed by the one or more processors, cause the computer system to alter the image of the second item such that the altered image is computationally distinct from the second image and usable for visually representing the second item.

* * * * *